US012483296B2

(12) United States Patent
Wang et al.

(10) Patent No.: US 12,483,296 B2
(45) Date of Patent: Nov. 25, 2025

(54) ASSISTING NODE (AN) FOR WIRELESS ENERGY TRANSFER

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/658,811

(22) Filed: Apr. 11, 2022

(65) Prior Publication Data
US 2023/0327709 A1    Oct. 12, 2023

(51) Int. Cl.
H04W 52/30    (2009.01)
H04B 5/77    (2024.01)
H04B 5/79    (2024.01)
H04L 5/14    (2006.01)
H04W 52/36    (2009.01)
H04W 60/04    (2009.01)

(52) U.S. Cl.
CPC ............... H04B 5/79 (2024.01); H04B 5/77 (2024.01); H04L 5/14 (2013.01); H04W 52/367 (2013.01); H04W 60/04 (2013.01)

(58) Field of Classification Search
CPC ... H04B 5/77; H04B 5/79; H04L 5/14; H04W 52/367; H04W 60/04
USPC ........................................................ 455/41.1
See application file for complete search history.

(56) References Cited

U.S. PATENT DOCUMENTS

| 2009/0167499 A1* | 7/2009 | Koo ................... G06K 7/0008 340/10.1 |
| 2009/0212921 A1* | 8/2009 | Wild ................... G01S 11/02 340/10.5 |
| 2010/0289627 A1* | 11/2010 | McAllister ............ H04L 9/3226 340/10.42 |
| 2016/0196455 A1* | 7/2016 | Gudan ................. H04B 5/77 340/10.5 |

(Continued)

FOREIGN PATENT DOCUMENTS

| EP | 3813336 A2 | 4/2021 |
| WO | 2009048308 A2 | 4/2009 |

OTHER PUBLICATIONS

International Search Report and Written Opinion—PCT/US2023/064199—ISA/EPO—Jun. 19, 2023.

*Primary Examiner* — Andrew Wendell
(74) *Attorney, Agent, or Firm* — Arent Fox, LLP

(57) ABSTRACT

Certain aspects are directed to an assisting node (AN) for wireless communications. The assisting node may operate as a relay or repeater (e.g., smart repeater), and may be configured to decode control signals it receives from a network node. The control signals may provide the AN with scheduling and resource allocations, and/or instruct the AN to use particular capabilities in its communications. The AN may include a memory and one or more processors configured to receive, from a network node, an energy transfer configuration providing the AN with a resource allocation for transmission of an information signal to the network node, the information signal comprising an indication of a backscatter signal received from a passive node. The AN may also be configured to transmit, based on the resource allocation, the information signal to the network node.

28 Claims, 13 Drawing Sheets

(56) References Cited

U.S. PATENT DOCUMENTS

| | | | | |
|---|---|---|---|---|
| 2016/0365890 | A1* | 12/2016 | Reynolds | H04B 1/525 |
| 2019/0053102 | A1* | 2/2019 | Oohira | H04W 16/02 |
| 2019/0260530 | A1* | 8/2019 | Yi | H04L 5/001 |
| 2020/0128507 | A1* | 4/2020 | Ryu | H04W 64/003 |
| 2021/0004544 | A1* | 1/2021 | Zhang | G06K 7/0008 |
| 2021/0167638 | A1* | 6/2021 | Yahagi | H02J 50/90 |
| 2021/0168700 | A1* | 6/2021 | Chen | H04W 48/16 |
| 2021/0250868 | A1* | 8/2021 | Ma | H04W 52/0212 |
| 2021/0313843 | A1* | 10/2021 | Lee | H02J 50/402 |
| 2022/0077886 | A1* | 3/2022 | Yan | G06K 19/07336 |
| 2022/0132455 | A1* | 4/2022 | Gupta | H04W 60/00 |
| 2022/0174676 | A1* | 6/2022 | Huang | G06K 7/10069 |
| 2022/0390393 | A1* | 12/2022 | Yan | H04L 7/033 |
| 2023/0262670 | A1* | 8/2023 | Dreiling | H04W 72/0453 370/329 |
| 2024/0155589 | A1* | 5/2024 | Davydov | H04W 72/232 |

* cited by examiner

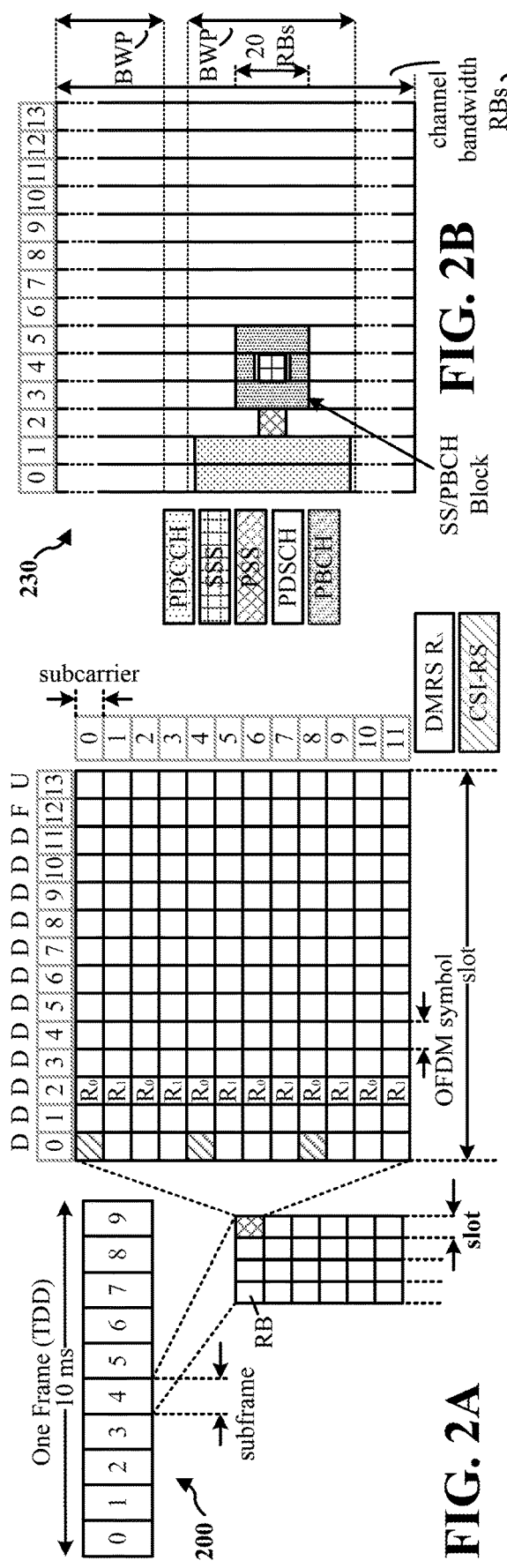
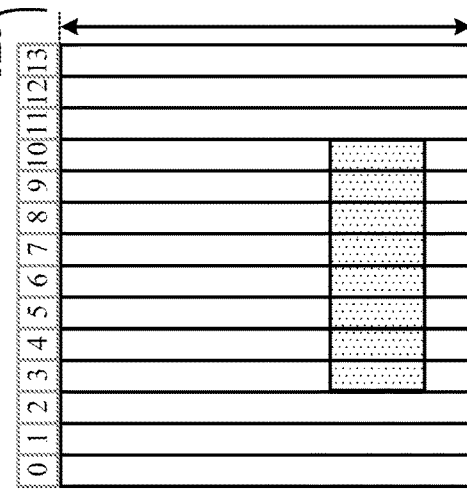
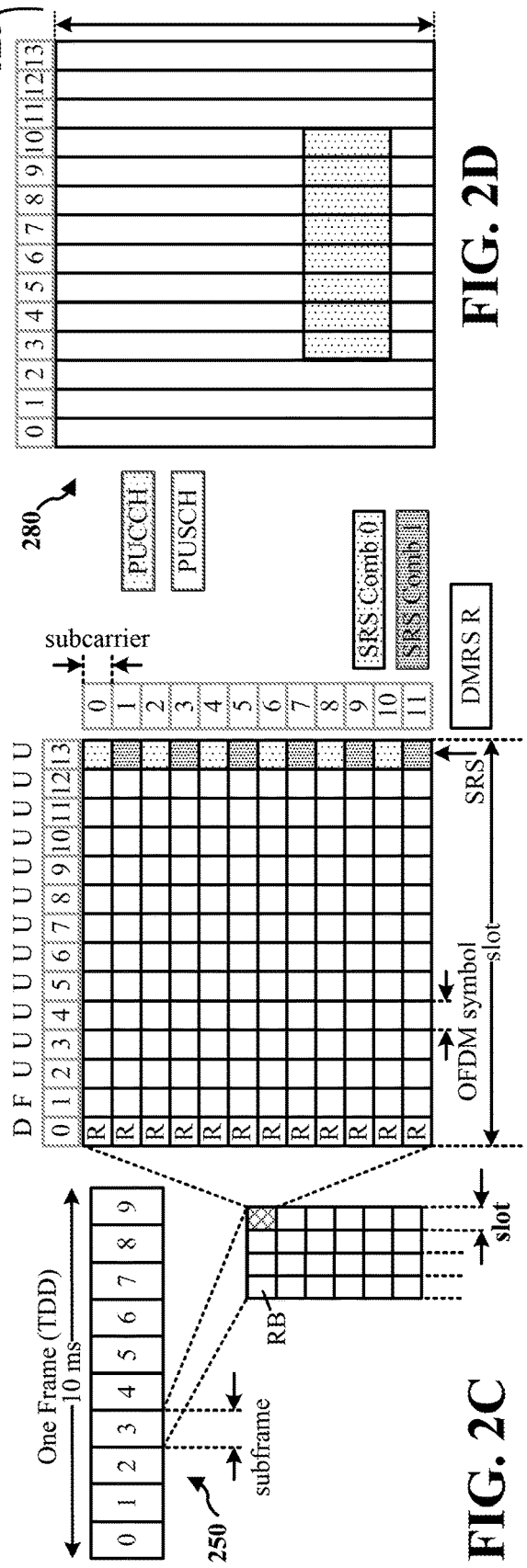

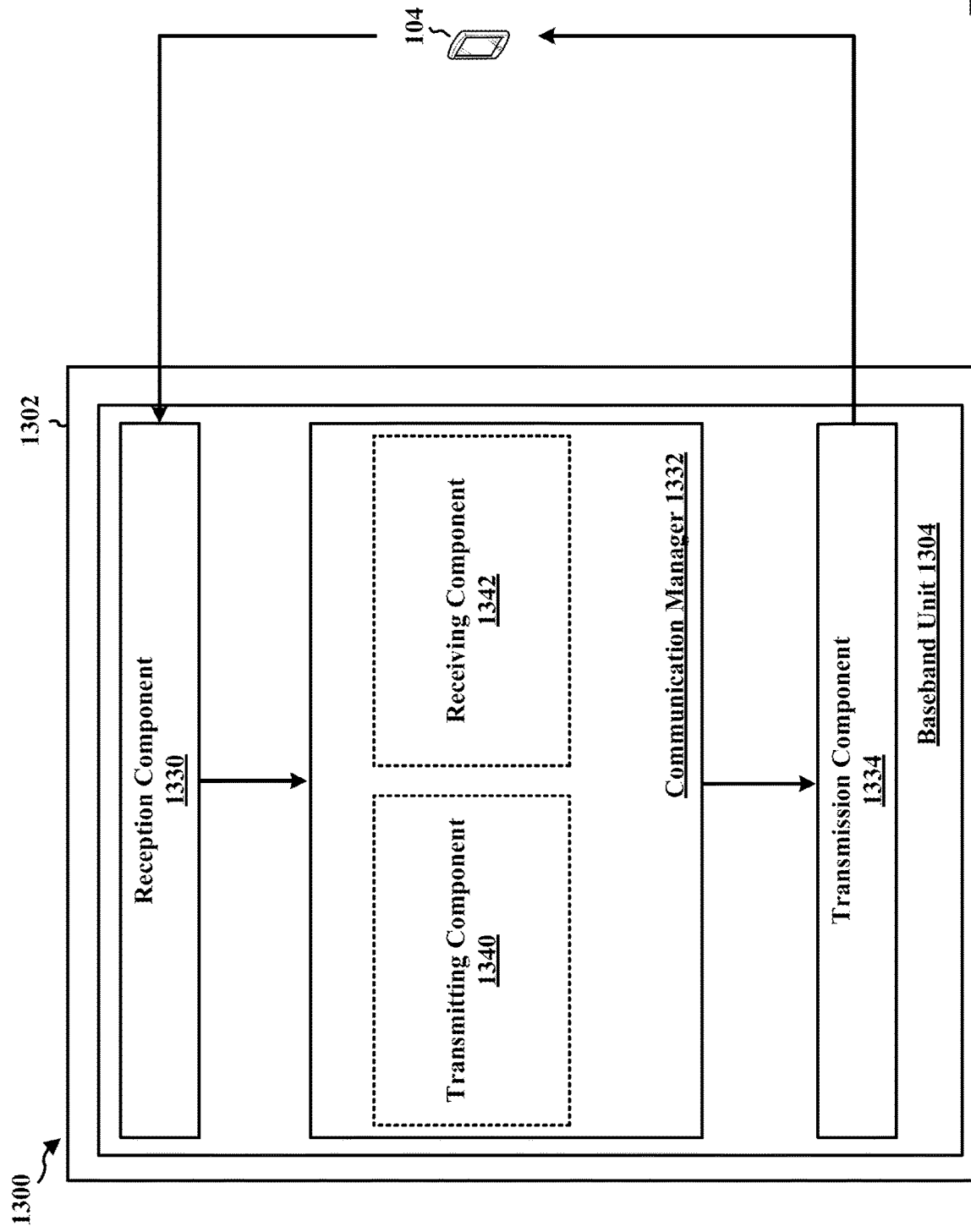

ASSISTING NODE (AN) FOR WIRELESS ENERGY TRANSFER

BACKGROUND

Technical Field

The present disclosure generally relates to communication systems, and more particularly, to an assisting node (AN) that may operate as a repeater for wireless energy transfer.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Certain aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an assisting node (AN) for wireless communications. In some examples, the AN includes a memory comprising instructions and one or more processors configured to execute the instructions. In some examples, the one or more processors are configured to cause the AN to receive, from a network node, an energy transfer configuration providing the AN with a resource allocation for transmission of an information signal to the network node, the information signal comprising an indication of a backscatter signal received from a passive node. In some examples, the one or more processors are configured to cause the AN to transmit, based on the resource allocation, the information signal to the network node.

Certain aspects are directed to a network node for wireless communications. In some examples, the network node includes a memory comprising instructions and one or more processors. In some examples, the one or more processors are configured to cause the network node to transmit an energy transfer configuration providing an assisting node (AN) with a resource allocation for transmission of an information signal to the network node, the information signal comprising an indication of a backscatter signal received from a passive node. In some examples, the one or more processors are configured to cause the AN to receive, based on the resource allocation, the information signal from the AN.

Certain aspects are directed to a method for wireless communication at an assisting node (AN). In some examples, the method includes receiving, from a network node, an energy transfer configuration providing the AN with a resource allocation for transmission of an information signal to the network node, the information signal comprising an indication of a backscatter signal received from a passive node. In some examples, the method includes transmitting, based on the resource allocation, the information signal to the network node.

Certain aspects are directed to a method of wireless communication at a network node. In some examples, the method includes transmitting an energy transfer configuration providing an assisting node (AN) with a resource allocation for transmission of an information signal to the network node, the information signal comprising an indication of a backscatter signal received from a passive node. In some examples, the method includes receiving, based on the resource allocation, the information signal from the AN.

Certain aspects are directed to an apparatus for wireless communication. In some examples, the apparatus includes means for receiving, from a network node, an energy transfer configuration providing the apparatus with a resource allocation for transmission of an information signal to the network node, the information signal comprising an indication of a backscatter signal received from a passive node. In some examples, the apparatus includes means for transmitting, based on the resource allocation, the information signal to the network node.

Certain aspects are directed to an apparatus for wireless communications. In some examples, the apparatus includes means for transmitting an energy transfer configuration providing an assisting node (AN) with a resource allocation for transmission of an information signal to the apparatus, the information signal comprising an indication of a backscatter signal received from a passive node. In some examples, the apparatus includes means for receiving, based on the resource allocation, the information signal from the AN.

Certain aspects are directed to a non-transitory computer-readable medium having instructions stored thereon that, when executed by an assisting node (AN), cause the AN to perform operations. In some examples, the operations include receiving, from a network node, an energy transfer configuration providing the AN with a resource allocation for transmission of an information signal to the network node, the information signal comprising an indication of a backscatter signal received from a passive node. In some examples, the operations include transmitting, based on the resource allocation, the information signal to the network node.

Certain aspects are directed to a non-transitory computer-readable medium having instructions stored thereon that, when executed by a network node, cause the network node to perform operations. In some examples, the operations include transmitting an energy transfer configuration providing an assisting node (AN) with a resource allocation for transmission of an information signal to the network node, the information signal comprising an indication of a backscatter signal received from a passive node. In some examples, the operations include receiving, based on the resource allocation, the information signal from the AN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 13 is a diagram illustrating another example of a hardware implementation for another example apparatus.

DETAILED DESCRIPTION

Figure 1:
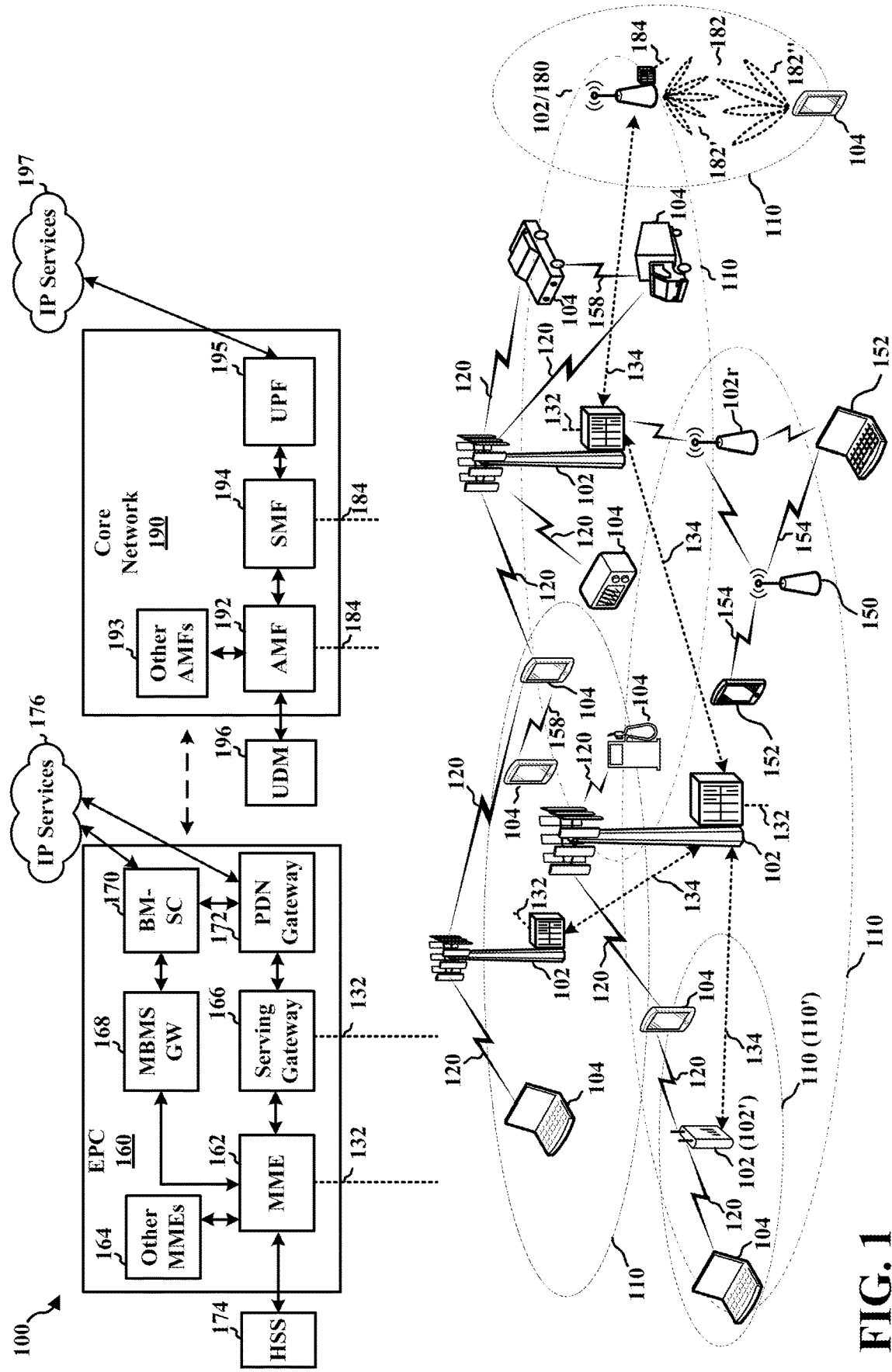
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of the disclosure are directed to smart repeaters configured at least in part as radio frequency identification (RFID) readers. In some examples, these smart repeaters may be referred to as assisting nodes (ANs), relays, or repeaters. In certain aspects, ANs may be network controlled, meaning that the ANs may be configured to receive and decode control information transmitted by, for example, a base station or a base station component, or another UE in a sidelink communication. The ANs may also support beam forming and different types of wireless communication. The types of wireless communication may include cellular communication (e.g., cellular signals, time-division duplex (TDD and frequency-division duplex (FDD) awareness), power transfer (e.g., wireless power charging), and energy transfer (e.g., energy signaling and backscattered modulated signaling associated with RFID communications and/or simultaneous wireless information and power transfer (SWIPT)). Accordingly, the network may control an AN via control signaling, as well as configure the AN to perform RFID communications with devices that carry an RFID tag. Such configurations may control the AN to use a particular type of antenna panel, to transmit and/or receive signaling at a particular frequency and/or at a particular power, etc., to provide interference management and target coverage enhancement (e.g., signal coverage and signal to interference and noise ratio (SINR) improvement).

RFID is a rapidly growing technology impacting many industries due to its economic potential for inventory/asset management inside and outside of warehouse, IoT, sensor networks in factories and/or agriculture, and smart homes. Typically, RFID includes small transponders, or "tags," configured to emit a backscatter modulated information-bearing signal based on a received signal.

RFID tends to have a long-life cycle, may be operated without battery, and at low operational expense and maintenance costs. As 5G expands into more industrial applications besides eMBB, (e.g., URLLC and MTC), 5G and beyond may be expanded to support passive IoT (PIoT) applications. For example, 3GPP specifications may support machine-type communication (MTC) and/or narrow band internet-of-things (NB-IoT), and RedCap for MTC use cases, but 5G may not support the most pervasive RFID-type of sensors (i.e., passive IoT devices) in many future use cases, including asset management, logistics, warehousing and manufacturing.

Thus, aspects of the disclosure are directed to devices, techniques and methods for managing passive IoT devices.

For example, a base station may read/write information stored on passive IoT devices, may provide energy to the passive IoT devices, may receive information-bearing signals from passive IoT devices, and may read and decode the information in signals reflected by passive IoT devices.

Accordingly, aspects of the disclosure are directed to an AN configured as a smart repeater for RFID/SWIPT energy transfer. In the case of a smart repeater, the AN may support one or more of amplify-and-forward relaying or decode-and-forward relaying. As such, the AN may communicate with a base station and perform other functions including RFID reading. Such a configuration may require communications between the AN and the base station. In one example, after the AN has registered with the base station, the base station may transmit a PIoT configuration message the AN. In some example, the base station may transmit a message to the AN requesting information about the AN's PIoT capability. The AN may respond by indicating its capability to transmit energy signals to an RFID and receive the backscatter modulation information signal, its capability to receive energy signals for recharging its battery and/or transmit energy signals for charging another device's battery, its capability for receiving and decoding backscatter modulation information signal, its capability for transmitting an indication of the backscatter modulation information signal (e.g., PIoT information, such as the decoded signal or the backscatter modulation information signal itself for decoding at the base station by L1/L2/L3 relaying). In some examples, the AN may report its capability during the registration, or other authentication procedure between the AN and base station.

In certain aspects, the AN may transmit a request to the base station requesting PIoT relay resources and/or parameters. For example, the AN may request resources such as time and frequency resource for: (i) transmitting an energy signal to an RFID tag, and/or (ii) transmitting PIoT information received from the RFID tag to the base station. The AN may also request parameters from the base station such as transmit power. The base station may control the resources and parameters used by the AN to reduce signal interference in, for example, an enclosed space.

In certain aspects, the AN may include one or more different antenna panels/arrays. The different antenna panels/arrays may be physically different and/or functionally different. For example, one or more antenna panels may provide for cellular communications, one or more antenna panels may provide for power transfer (e.g., battery charging), and one or more antenna panels may provide for energy transfer used in PIoT operations (e.g., RFID/SWIPT operations). The AN may transmit an indication of the different capabilities associated with its antennas to the base station as part of a registration procedure or in response to capability request.

In certain aspects, the AN may be defined by a particular class of AN. For example, one class may be only capable of supporting cellular signals, while another class may support both cellular and PIoT signals. Yet another class may support cellular signals, PIoT signals, and power transfer signals. Different classes may also be associated with different functions. For example, an AN may be associated with a first class of devices that can actively generate cellular, power, and PIoT signals. A second class may include the functionality of the first class, and may also include a decode-and-forward functionality wherein the AN can decode PIoT signals and forward the decoded signal to the base station. Yet another class of AN may include an AN that is capable of beamforming transmission/reception of cellular signals, PIoT signals, and/or power transfer signals. Yet another class of AN may include an AN capability for different levels of amplification gain and transmit power. For example, some classes of AN may have a higher maximum amplification gain and/or transmit power gain for one or more types of signaling. The AN may transmit an indication of the particular class and the associated capabilities to the base station as part of a registration procedure or in response to capability request.

In certain aspects, the AN may be configured to communicate one or more types of signaling (e.g., cellular signals, PIoT signals, and/or power transfer signals) in full duplex (e.g., frequency-division duplex (FDD), time-division duplex (TDD), transmit and receive signals simultaneously (using the same or different beams), receive multiple signals simultaneously, etc.). In some examples, the AN may be configured to communicate the one or more types of signaling using different types of multiplexing. For example, if the AN is not capable of full-duplex communication of certain signals, then the AN may utilize time-division multiplexing (TDM) to provide a guard period (e.g., Tn) between different signals (e.g., T1 for switch from cellular signal to PIoT signal, T2 for switch from RFID/SWIPT energy transfer signal to cellular signal, etc.). In some examples, the AN may be configured for frequency-division multiplexing (FDM) if, for example, two or more signals can be transmitted using different frequencies. In yet another example, the AN may be configured for spatial-domain multiplexing (SDM), wherein the signals are transmitted using the same time and frequency resources, but the beam directions are different. The AN may transmit an indication of its duplexing and multiplexing capabilities to the base station as part of a registration procedure or in response to capability request.

In certain aspects, the AN may support one or more types of carrier aggregation (CA). For example, the AN may communicate one or more types of signaling (e.g., cellular signals, PIoT signals, and/or power transfer signals) using CA. Type of CA may include intra-band contiguous signaling, intra-band non-contiguous signaling, and/or inter-band non-contiguous signaling. The AN may transmit an indication of its CA capabilities to the base station as part of a registration procedure or in response to capability request.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Throughout the disclosure, a "network node" may be used to refer to a base station. A network node or base station can be implemented as an aggregated base station, as a disaggregated base station, an integrated access and backhaul (IAB) node, a relay node, a sidelink node, etc. A network node can be implemented in an aggregated or monolithic base station architecture (e.g., FIG. 4), or alternatively, in a disaggregated base station architecture (e.g., FIG. 5), and may include one or more of a central unit (CU), a distributed unit (DU), a radio unit (RU), a near-real time (near-RT) radio access network (RAN) intelligent controller (RIC), or a non-real time (non-RT) MC.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Access network 100 may also include relay/repeater stations (e.g., assisting node (AN) 102r), also referred to as a smart repeater, an RF repeater, a reflector (RIS/IRS), or the like, that receive a transmission of data and/or other information from an upstream station (e.g., a base station 102, a UE 104, and RFID device/tag, etc.) and sends a transmission of the data and/or other information to a downstream station (e.g., a UE 104 or a BS 102). As disclosed, the AP 102r may be configured to operate as both a relay/repeater and an RFID reader. It should be noted that base station 102/180 may operate as an AN.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the AN (e.g., UE 104/base station 102/180/102r/base station component) may be configured to receive, from a network node, an RFID/SWIPT configuration providing the AN with a resource allocation for transmission of an information signal to the network node, the information signal comprising an indication of a backscatter signal received from a passive node; and transmit, based on the resource allocation, the information signal to the network node.

In certain aspects, a UE 104/base station 102/180/base station component in communication with the AN may be configured to transmit the RFID/SWIPT configuration providing an assisting node (AN) with a resource allocation for transmission of an information signal to the network node, the information signal comprising an indication of a backscatter signal received from a passive node; and receive, based on the resource allocation, the information signal from the AN.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
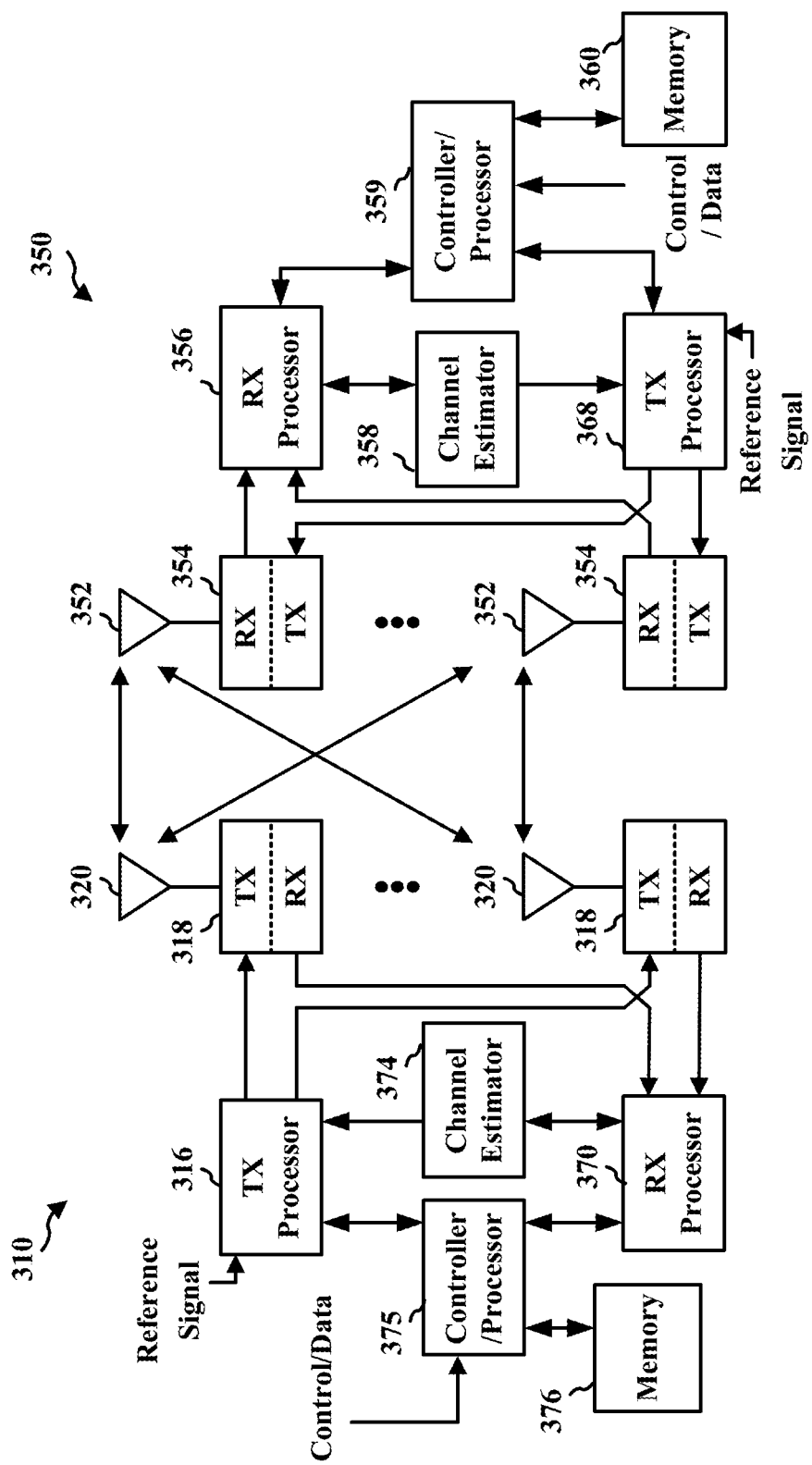
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 10:
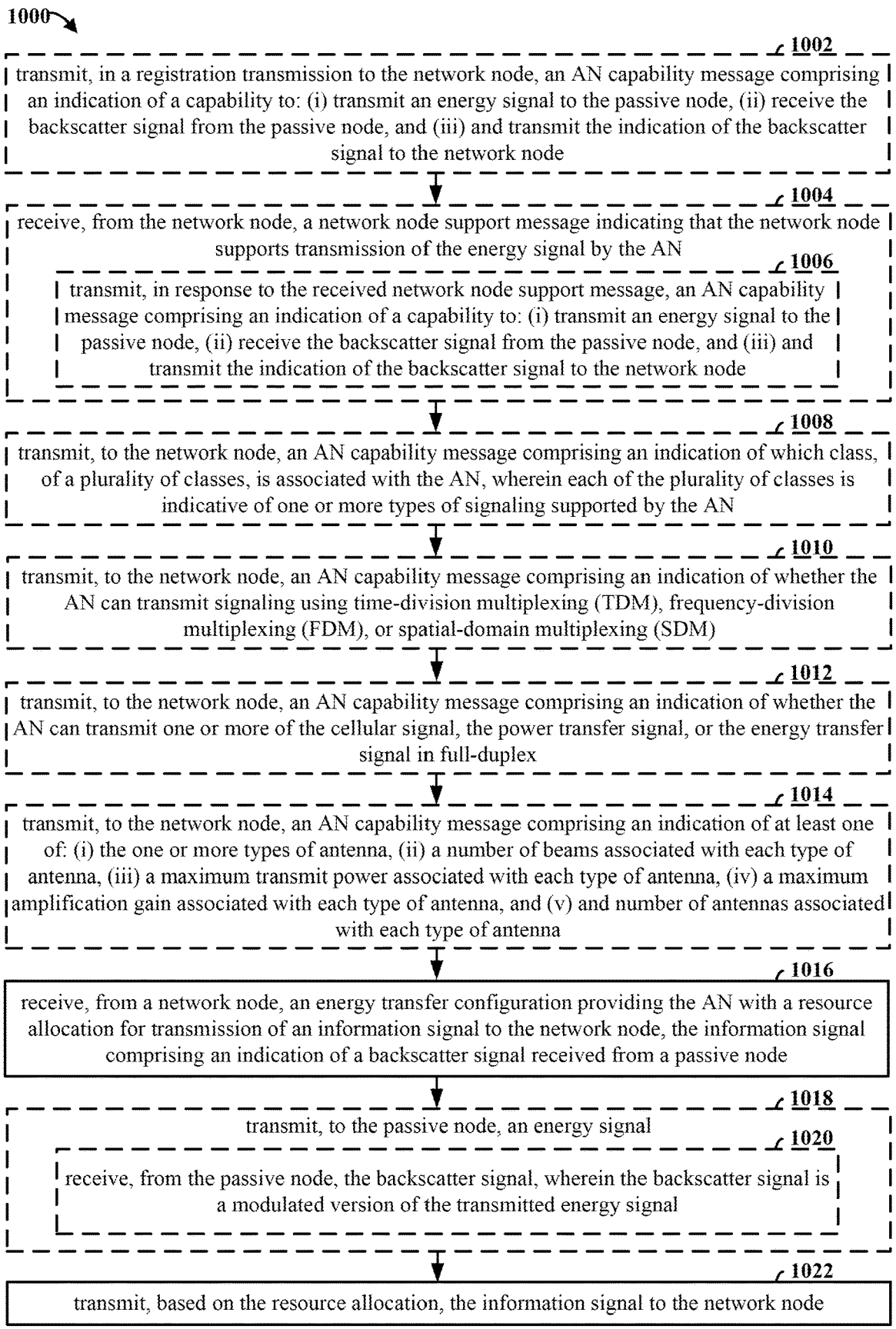
FIG. 10 is a flowchart of a method of wireless communication.
Figure 12:
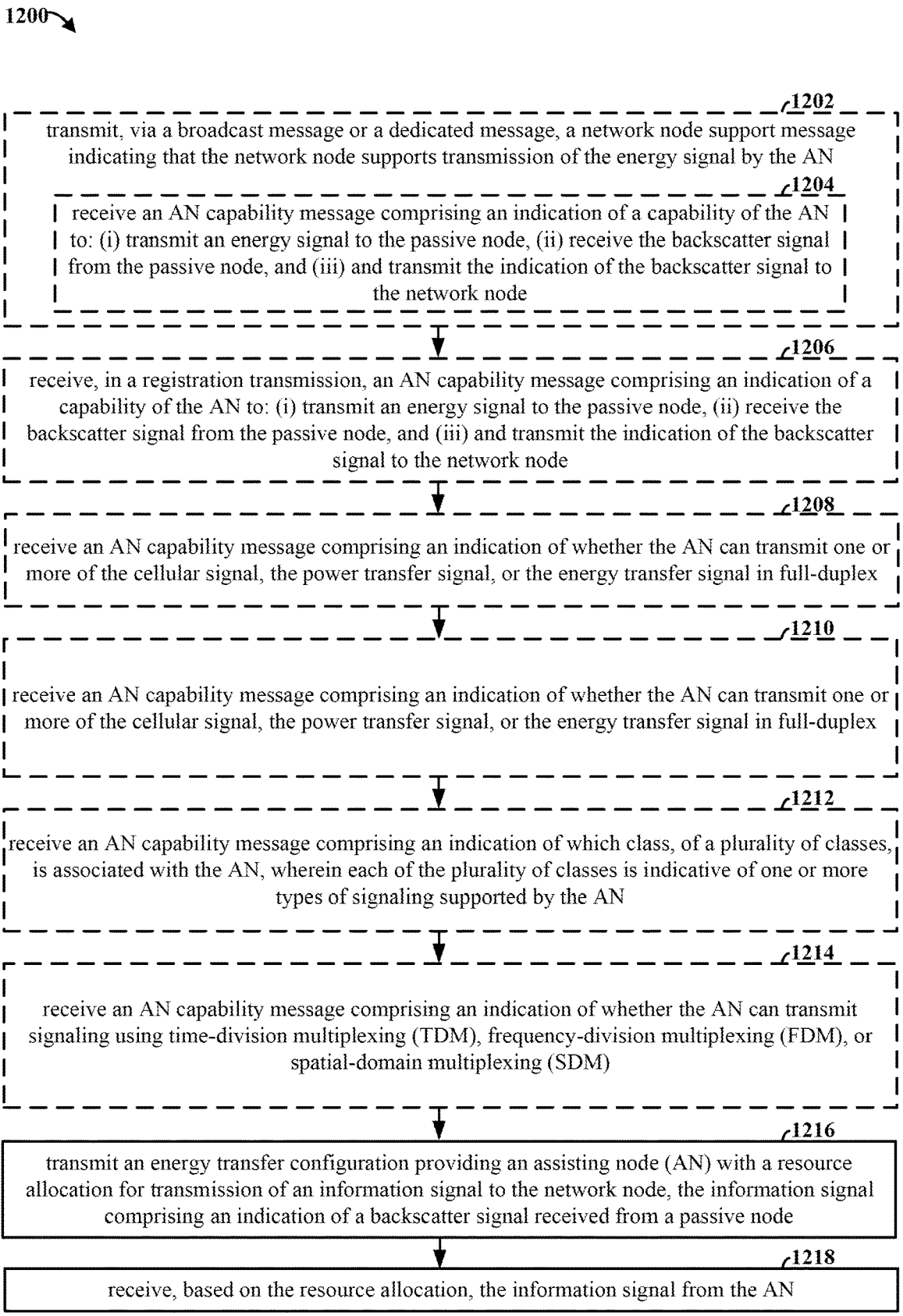
FIG. 12 is a flowchart of a method of wireless communication.

At least one of the TX processor 368, the RX processor 356, and the controller/processor 359 may be configured to perform aspects in connection with one of the flowcharts illustrated in FIGS. 10 and 12.

At least one of the TX processor 316, the RX processor 370, and the controller/processor 375 may be configured to perform aspects in connection with one of the flowcharts illustrated in FIGS. 10 and 12.

Figure 4:
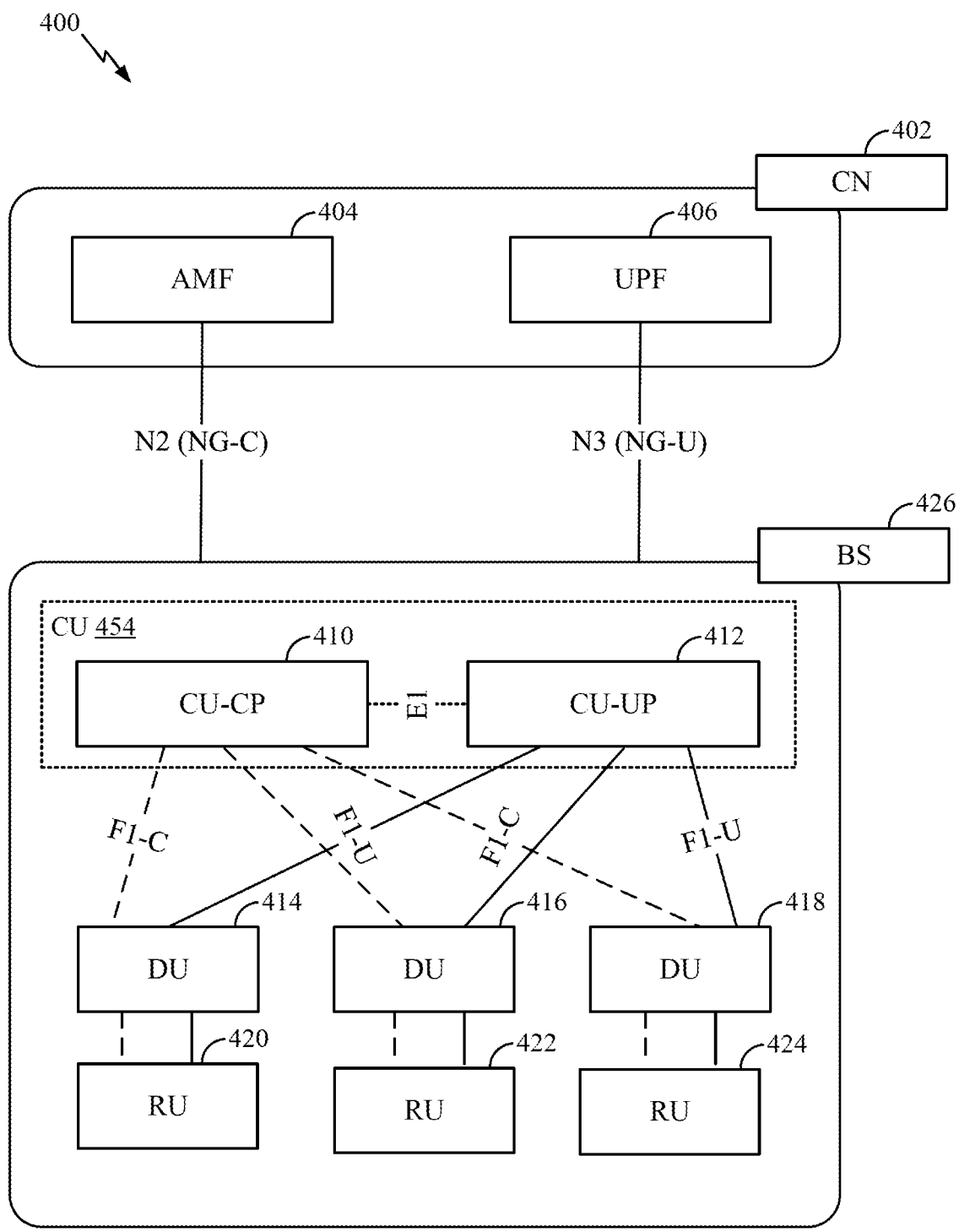
FIG. 4 is a block diagram illustrating an example monolithic (e.g., disaggregated) base station and architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
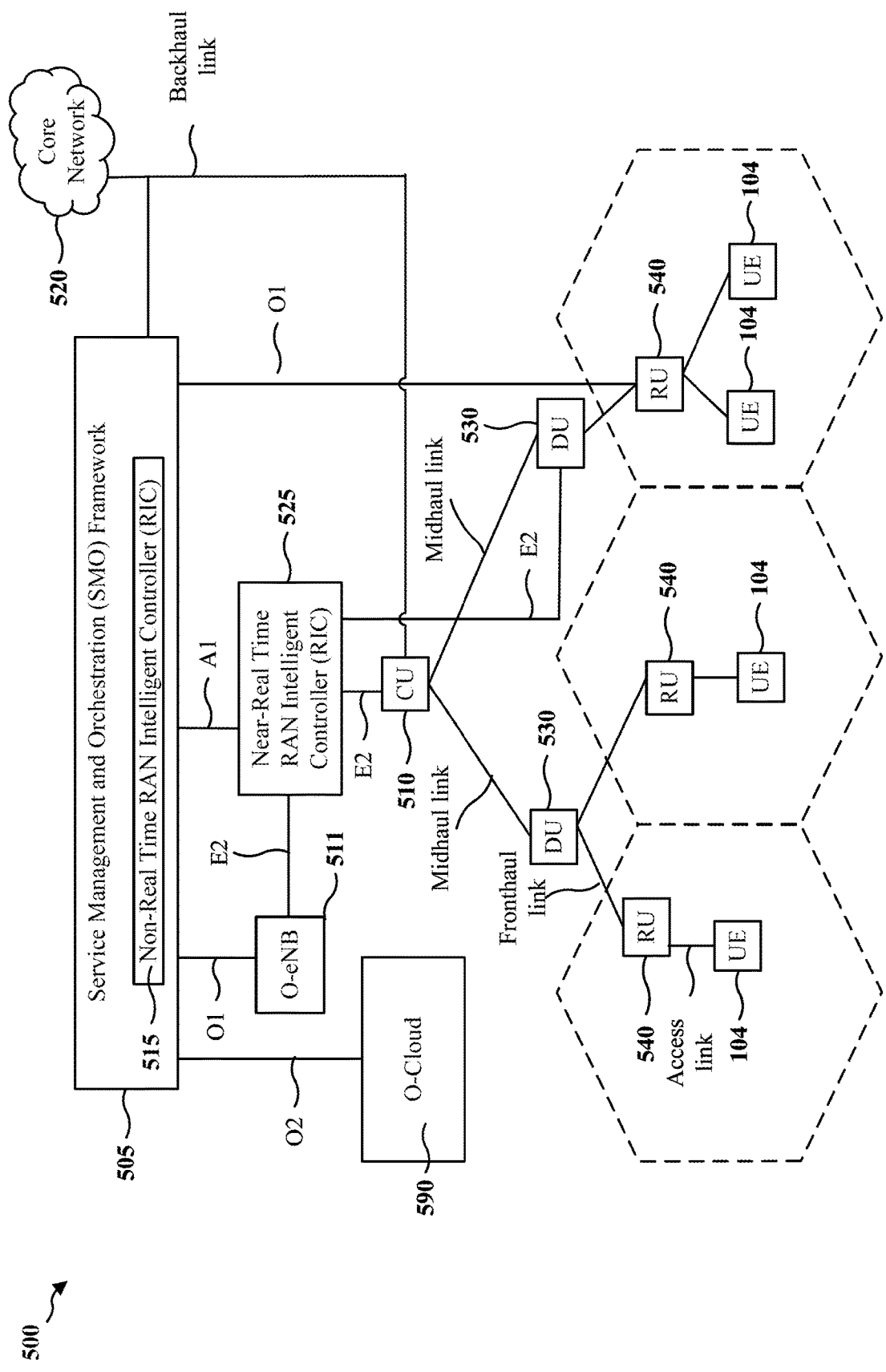
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) MC 525 via an E2 link, or a non-RT MC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit—user plane (CU-UP)), control plane functionality (i.e., central unit—control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT MC 515 may receive parameters or external enrichment information from external servers. Such information may be utilized by the near-RT MC 525 and may be received at the SMO Framework 505 or the non-RT MC 515 from non-network data sources or from network functions. In some examples, the non-RT MC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
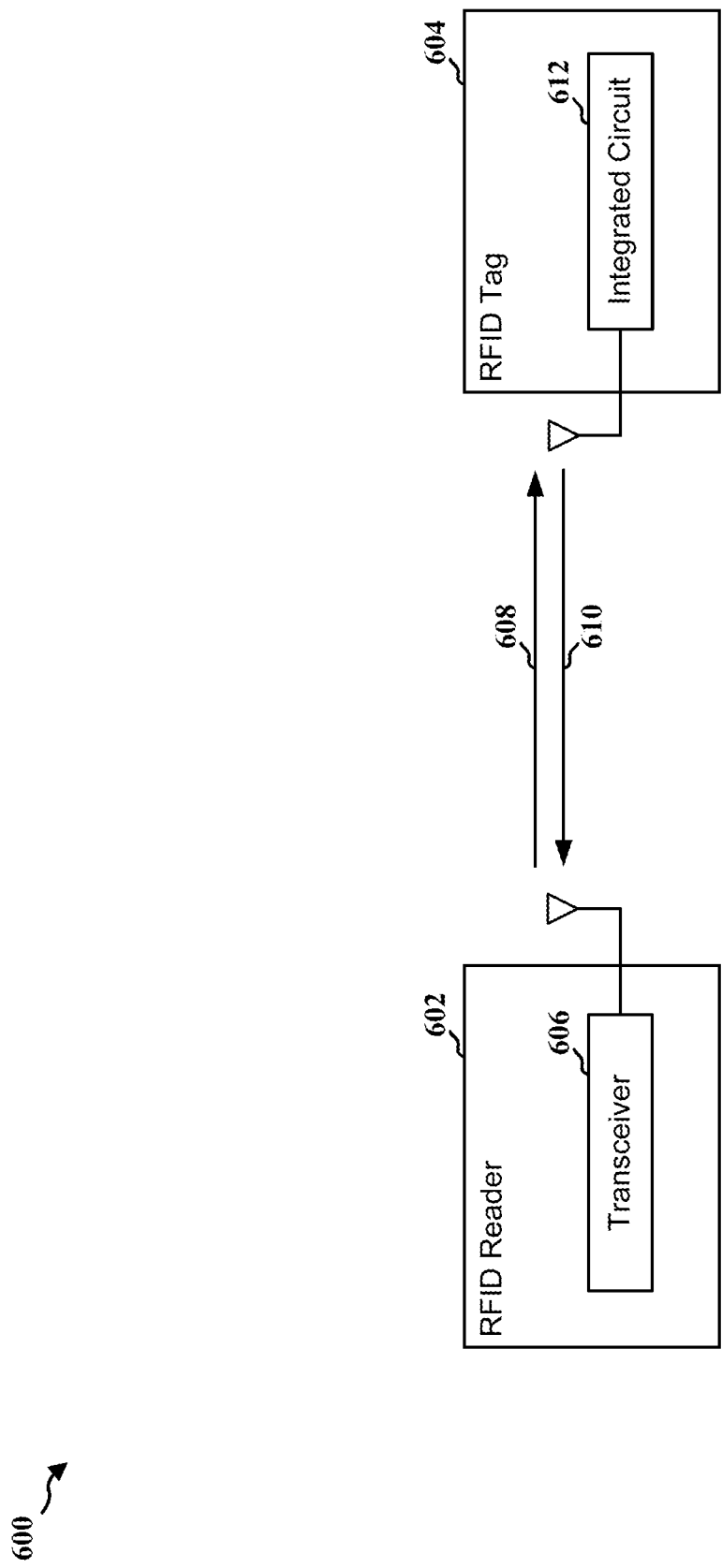
FIG. 6 is a block diagram illustrating example radio frequency identifier (RFID) reader communications with an RFID tag.

FIG. 6 illustrates a simplified block diagram of an RFID reader 602 communicating with an RFID tag 604 in a wireless communications system 600. RFID reader 602 is one possible implementation of RFID reader and may be any configured as a wireless communication node between a base station (e.g., base station 102 or a base station component of FIG. 1, a sidelink UE 104 of FIG. 1, etc.) and an end user (e.g., a UE 104 of FIG. 1). The RFID reader may be implemented on an AN such as a smart repeater, an RF repeater, a reflector (e.g., intelligent reflective surface (IRS) or reconfigurable intelligent surface (RIS)), or another UE in a sidelink communication. The RFID tag 604 is one possible RFID tag associated with, for example, a passive internet of things (PIoT).

RFID tag 604 can be either a passive, active, or battery-assisted passive. An active RFID tag has an on-board battery and periodically transmits its ID signal. A battery-assisted passive (BAP) RFID tag has a small battery on board and is activated when in the presence of RFID reader 602. A passive RFID tag is cheaper and smaller because it has no battery; instead, the passive RFID tag uses the radio energy transmitted by the RFID reader 602. However, to operate a passive RFID tag, it must be illuminated with a power level much larger than required for the passive RFID tag to transmit a signal transmission.

RFID tag 604 may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user.

RFID tag 604 may contain at least two parts: (1) an integrated circuit 612 for storing and processing information, modulating and demodulating a received RF signal, collecting DC power from the incident reader signal, generating a backscatter modulated information signal, and other specialized functions; and (2) an antenna for receiving and transmitting the backscatter modulated information signal 610. The tag information may be stored in a non-volatile memory contained in the RFID tag 604. The RFID tag 604 may include either fixed or programmable logic for processing the transmission and sensor data, respectively.

The transceiver 606 of the RFID reader 602 transmits one or more messages by way of a continuous RF wave 608 to energize and interrogate the RFID tag 604. Although FIG. 6 illustrates transceiver 606 as transmitting one continuous RF wave 608, in other aspects the transceiver 606 may be configured to generate multiple continuous RF waves. The RFID tag 604 receives the message and then responds with its identification and other information by generating a backscatter modulated information signal 610. The identification may be a unique tag serial number, and the other information may be product-related information such as a stock number, lot or batch number, production date, or other specific information. Since RFID tags 604 have individual serial numbers, the RFID reader 602 can discriminate among several tags that might be within the range of the RFID reader 602 and read them simultaneously. A passive RFID tag generates the backscatter modulated information signal 610 by reflecting back a portion of the continuous RF wave 608 in a process known as backscatter. Thus, the frequency of the backscatter modulated information signal 610 is determined by the frequency of the continuous RF wave 608. That is, in one example the frequency of the backscatter modulated information signal 610 is equal to the frequency of the continuous RF wave 608 received at the RFID tag 604.

Example Assisting Node (AN) Operations

Figure 7:
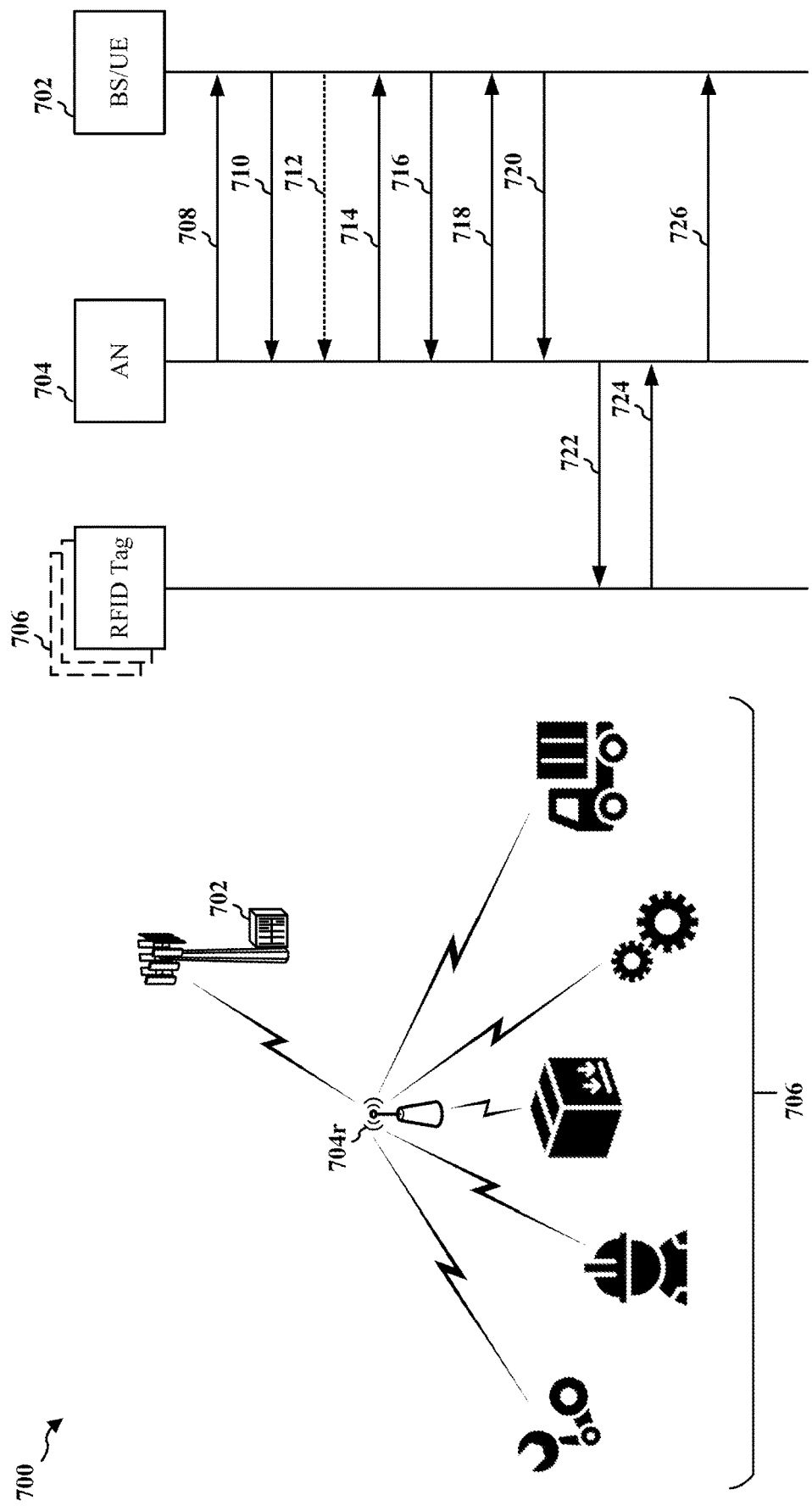
FIG. 7 is a diagram illustrating example communications between one or more devices with RFID tags (e.g., passive nodes) and a base station or UE using an assisting node (AN) configured as an RFID reader and a relay.

FIG. 7 is a diagram illustrating example communications 700 between one or more devices with RFID tags 706 (e.g., passive nodes) and a UE or a base station 702 using an AN 704 configured as an RFID reader and a relay. FIG. 7 illustrates one example scenario in an industrial IoT or PIoT setting wherein multiple devices/personnel have an RFID tag 706 that can be read by the AN 704. Although referred to as a base station 702 throughout the disclosure, the node 702 may be a UE or a base station component of a disaggregated base station.

In a first communication 708, the AN 704 may transmit a registration communication to register with the base station 702. By registering, the base station 702 is made aware of the presence of the AN 704.

In a second communication 710, the base station 702 may transmit a PIoT configuration to the AN 704, wherein the PIoT configuration indicates a capability of the base station 702 to receive a backscatter RFID signal and/or a decoded backscatter RFID signal from the AN 704. Accordingly, the second communication 710 may inform the AN 704 that it may transmit RFID data/backscatter information to the base station 702. The second communication 710 may be transmitted by the base station 702 via a broadcast message or a dedicated message to the AN 704. Optionally, if the AN 704 does not respond to the second communication 710 (e.g., if the second communication 710 is a dedicated message), the base station 702 may transmit a query (e.g., in a third communication 712) to request that the AN 704 provide a capability report to the base station 702. In some examples, the base station 702 may not support energy transfer for PIoT operations such as RFID/SWIPT in its cell. For example, if the traffic load in a cell is too high or if the base station 702 determines not to allow for RFID reading, then the PIoT configuration may indicate that RFID reading is not supported in the cell.

In a fourth communication 714, the AN 704 may transmit, in response to one or more of the second communication 710 or the third communication 712, an AN capability message comprising an indication of AN 704 capabilities related to the RFID reading and relay functionality of the AN 704. The AN capability message may indicate that the AN 704 is capable of: (i) transmitting an energy signal to the one or more devices 706, (ii) receiving the backscatter signal from the one or more devices 706, and (iii) transmitting an indication of the backscatter signal to the base station 702. It should be noted that in some examples, the AN capability message may be transmitted with the registration message of the first communication.

Figure 8:
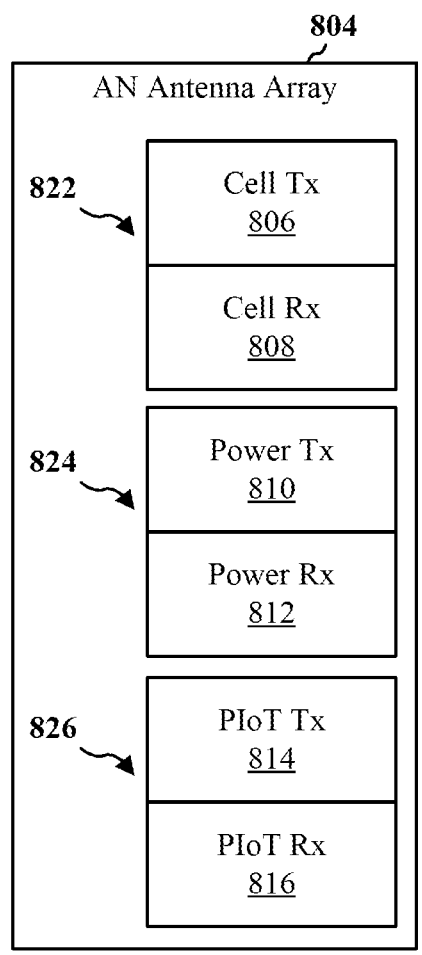
FIG. 8 is a block diagram illustrating a simplified AN antenna array having three different categories of antennas.

In certain aspects, the AN 704 may include an antenna array defined by one or more types of antenna and/or transceiver. For example, the AN 704 may include one or more of a cellular antenna, a power transfer antenna, or an antenna configured to support PIoT operations such as RFID/SWIPT. FIG. 8 is a block diagram illustrating a simplified AN antenna array 804 (e.g., AN 704) having three different categories of antennas. It should be noted that the AN may include more or fewer categories of antenna that are shown in FIG. 8. For example, the AN may have only one category of antenna. A first antenna category 822 is a cell antenna configured with both cell transmit 806 and cell receive 808 antennas. Each of the cell transmit 806 and cell receive 808 antennas may include a separate array of antennas, or a single array of antennas configured for beamforming and/or codebooks for cell communications according to 3GPP standards.

A second antenna category 824 is a power transfer (e.g., wireless battery charging) antenna that includes a power transmit 810 antenna and a power receive 812 antenna. The power transmit 810 antenna and the power receive 812 antenna may be separate arrays of one or more antennas or one or more antennas configured for both of power transmit 810 and power receive 812. The second antenna category 824 may be optimized for transferring power by utilizing a specific frequency band that is different from a frequency band used by the first antenna category 822 and/or any other category of antenna in the AN antenna array 804. In some examples, the second antenna category 824 may have only one of the power transmit 810 antenna or the power receive 812 antenna. As such, in some examples, the AN may be capable of one of transmitting power (e.g., charging another device battery) or receiving power (e.g., receiving power to charge a battery of the AN).

A third antenna category 826 is a PIoT antenna that includes a PIoT transmit 814 antenna and a PIoT receive 816 antenna. The PIoT transmit 814 antenna and the PIoT receive 816 antenna may be separate arrays of one or more antennas or one or more antennas configured for both of PIoT transmit 814 and PIoT receive 816. In some examples, the third antenna category 826 may be configured to use a different frequency band than one or more of the first antenna category 822 and/or the second antenna category 824. The AN may use the third antenna category 826 for RFID reading (e.g., as described in reference to FIG. 4) of RFID tags (e.g., RFID tags 706 of FIG. 7). For example, the third antenna category 826 may be configured to transmit an energy signal to an RFID tag, and receive the backscattered modulation signal in response.

In some examples, each of the three categories of antenna may use a separate subset of the physical antennas in the AN antenna array 804. In another example, one or more of the three antenna categories may use the same physical antennas. Thus, if a cell/power/PIoT signal uses the same or similar frequency bands as another signal, then the two signals may share the same physical antenna. In another example, the AN may use a subset of antennas from one of the three categories of antenna to transmit/receive a different type of signal. For example, the AN may use a subset of antennas from the first antenna category (e.g., antennas used for cell signaling) to transmit and/or receive PIoT signals. In another example, the first antenna category may be configured to communicate at least two of a cellular signal, a power transfer signal, or PIoT signal In some examples, the AN may dynamically assign different signals to different physical antennas in order to reduce self-interference/coupling.

Referring back to FIG. 7, the AN 704 may include the aforementioned information in the AN capability message. For example, the AN capability message may provide an indication of one or more categories of antenna used by the AN 704, they type(s) of signaling supported by each of the categories, whether the categories support transmit or receive, or both, whether one or more categories of antenna can support multiple types of signal, etc. Alternatively, or in addition, the AN capability message may include an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) and number of antennas associated with each type of antenna.

In certain aspects, the AN 704 may be defined by a class of AN. For example, the AN 704 may be associated with one or more of a plurality of classes that characterize the AN as having one or more capabilities. The AN 704 may be pre-defined as associated with a particular class by the base station 702, or during a manufacturing step.

For instance, a first AN class may indicate that the AN 704 can only support cellular signaling (e.g., both transmission and reception). A second AN class may indicate that the AN 704 can support cellular signaling and PIoT signaling. A third AN class may indicate that the AN 704 can support cellular signaling, PIoT signaling, and power transfer signaling. Additional classes may indicate whether one or more of the supported signaling is transmit-only, receive-only, or both. Accordingly, the AN capability message may include an indication of which class, of a plurality of classes, is associated with the AN 704, wherein each of the plurality of classes is indicative of one or more types of signaling supported by the AN 704.

In certain aspects, the AN 704 may support one or more of a passive signal relay capability or an active signal relay capability. That is, the AN 704 may support one or more of passive signal generation or active signal generation for at least one of cellular signaling, PIoT signaling, and power transfer signaling. In an example of active signaling, the AN 704 may receive and decode a backscatter signal from a device 706, then transmit a PIoT signal or cellular signal to the base station 702 that includes the decoded backscatter signal. Other active examples may include using beamforming to transmit signaling. In a passive example, the AN 704 may receive a backscatter signal from a device 706, then forward the backscatter signal to the base station 702 using a PIoT signal or a cellular signal. In some passive examples, the AN 704 may amplify the signal being forwarded (e.g., amplify-and-forward) to the base station. Maximum amplification gain and maximum transmit power levels of the AN 704 may be different for each type of signal. Accordingly, the AN capability message may include an indication of a relay capability associated with the AN 704. The indication of the relay capability may be in terms of the type of signaling and/or the passive/active nature of the capability. For example, AN capability message may indicate that the AN 704 supports pass-through signaling, amplify-and-forward signaling, beam steering signaling, and/or decode-and-forward signaling. The AN capability message may also indicate maximum values for amplification gain and transmit power for one or more of the signals supported by the AN 704.

In certain aspects, the AN 704 may support a full-duplex communication capability of one or more of the cellular signaling, PIoT signaling, and power transfer signaling. For example, the AN 704 may support simultaneous transmit and receive of a particular type of signal (e.g., simultaneous transmit and receive of cellular signaling), and/or simultaneous transmit/receive of one or more types of signaling (e.g., simultaneous transmit/receive of cellular signaling and transmit/receive of PIoT signaling).

In one example, the AN 704 may be capable of using beamforming to achieve full-duplex communication of one or more types of signals (e.g., using the same or different beams). For instance, the AN 704 may transmit and receive PIoT signals (e.g., energy transmission and received backscatter modulation signal) using different beams for transmission and reception. The AN 704 may also support an FDD capability, wherein the cellular signaling, PIoT signaling, and/or power transfer signaling are communicated simultaneously using different carriers and/or bands. In this example, the AN 704 may transmit and receive a particular type of signal in the same band/carrier. In some examples, the AN 704 may be configured to operate in a full-duplex mode where the AN 704 communicates different types of signals using different sub-bands. That is, the AN 704 may have a capability to FDM two or more of the signal types relative to each other. As such, each signal type may be assigned (e.g., by the base station 702) and occupy the same band, but also different sub-bands relative to another signal type. Accordingly, the AN capability message may include an indication of a duplex capability associated with the AN 704. For example, the AN capability message may include an indication of whether the AN 704 can transmit one or more of a cellular signal, a power transfer signal, or a PIoT signal in full-duplex, and how the full-duplex is achieved (e.g., FDD, beamforming, etc.). The AN capability message may also indicate which signals the AN 704 is capable of transmitting and receiving in a full-duplex mode. For example, AN 704 may be capable of transmitting/receiving cellular signals and PIoT signals simultaneously, transmitting/receiving power signals and PIoT signals simultaneously, transmitting PIoT signals and receiving NR signals simultaneously, or transmitting/receiving one type of signal at the same time.

In certain aspects, the AN 704 may support one or more wireless signal multiplexing capabilities. For example, the AN 704 may be capable of one or more of TDM, FDM, and SDM. For instance, the AN 704 may be capable of TDM if it is not capable of supporting full-duplex. In such an example, a guard symbol may be used by the AN 704 to switch its transceiver from transmit/receive of a first signal to receive/transmit of a second signal. In some examples, the AN 704 may use a different pre-configured guard time (e.g., $T_n$) for switching between different signal types. For example, $T_1$ may be used for switching from a cellular signal to a PIoT signal, $T_2$ may be used for switching from a power transfer signal to a cellular signal, etc.

In another example, the AN 704 may be configured to use FDM if two or more signals can be transmitted using different frequencies. Similar to TDM, the AN 704 may use a guard band in the frequency domain if the AN 704 supports AF amplify-and-forward (e.g., where the AN 704 only amplifies the a pass-through signal but does not generate it). The AN 704 may use a smaller guard band if the AN 704 supports decode-and-forward (e.g., where the AN 704 actively generates a signal it transmits).

In yet another example, the AN 704 may be configured to use SDM if the signals are transmitted using the same time and frequency resources; for example, where the beam directions are different. Accordingly, the AN capability message may include an indication of a multiplexing capability associated with the AN 704. For example, AN capability message may indicate whether the AN 704 can transmit signaling using one or more of TDM, FDM, or SDM. In some examples, the AN capability message may also include an indication of guard time durations for different signals, beam directions, etc.

Figure 9:
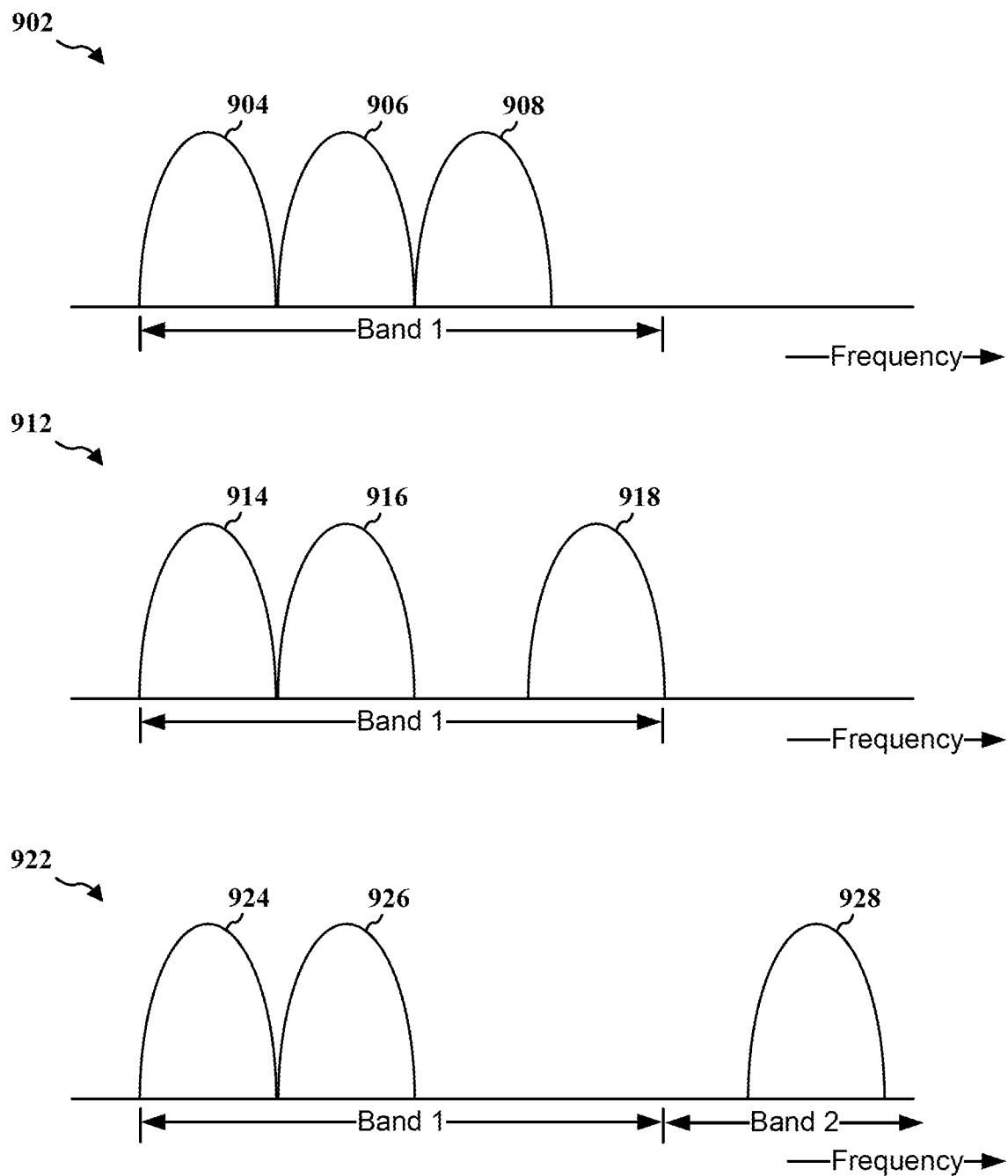
FIG. 9 is a diagram illustrating three examples of carrier aggregation (CA) configurations.

In certain aspects, the AN 704 may be configured to support different CA configurations for different signal types, and/or different CA configurations for different combinations of signal types. For example, the AN 704 may support one or more carrier combinations of cellular signaling, power transfer signaling, and PIoT signaling. FIG. 9 is a diagram illustrating three examples of CA configurations. A first example 902 is illustrative of an intra-band contiguous signal configuration. Here, a first signal 904 occupies a first subcarrier of band 1, a second signal 906 occupies a second subcarrier of band 1, and a third signal 908 occupies a third subcarrier of band 1. Note that each of the three subcarriers is contiguous in relation to another subcarrier. In one example, the first signal 904 may be a PIoT signal, the second signal 906 may be a cellular signal, and the third signal 908 may be a power transfer signal. It should be noted that any suitable arrangement of signals and subcarriers may be used. In some examples, the cellular signal carrier and the power transfer signal may partially or fully overlap. In another example, the PIoT signal carrier and the power transfer carrier may partially or fully overlap.

A second example 912 is illustrative of an intra-band non-contiguous signal configuration. Here, a first signal 914 occupies a first subcarrier of band 1, a second signal 916 occupies a second subcarrier of band 1, and a third signal 918 occupies a third subcarrier of band 1; however, in this example, the third signal occupies a subcarrier that is non-contiguous with the first subcarrier and the second subcarrier. In another example, none of the three subcarriers may be contiguous with each other, but they may still share the same band. In one example, the first signal 914 may be a power transfer signal, the second signal 916 may be a cellular signal, and the third signal 918 may be a PIoT signal. It should be noted that any suitable arrangement of signals and subcarriers may be used.

A third example 922 is illustrative of an inter-band non-contiguous signal configuration. Here, a first signal 924 occupies a first subcarrier of band 1, a second signal 926 occupies a second subcarrier of band 1, and a third signal 928 occupies a third subcarrier of band 1; however, in this example, the third signal 928 occupies a separate band relative to the first subcarrier and the second subcarrier, and is non-contiguous with the first subcarrier and the second subcarrier. In one example, the first signal 924 may be a power transfer signal, the second signal 926 may be a cellular signal, and the third signal 928 may be a PIoT signal. It should be noted that any suitable arrangement of signals and subcarriers may be used.

Accordingly, the AN capability message may include an indication of different CA capabilities associated with the AN. For example, the AN capability message may indicate possible arrangements of signal types and associated carriers in CA.

Referring back to FIG. 7, in a sixth communication 716, the base station 702 may transmit a resource allocation and/or an indication of scheduling for the AN 704. For example, the base station 702 may transmit the sixth communication 716 in response to the AN capability message if the message confirms that the AN 704 is capable of performing RFID reading and relaying the RFID read information to the base station 702. In some examples, the resource allocation may include time and frequency resources that the AN 704 may use to transmit an energy signal to one of the devices 706, and time and frequency resources that the AN 704 may use to transmit the backscatter information to the base station 702. The base station 702 may also provide a scheduling for the transmissions, including a periodic RFID read, a semi-static RFID read (e.g., authorizing the AN 704 to continually perform RFID reading and communications with the base station 702 if conditions are met), or a static RFID read (e.g., only one RFID event is scheduled and authorized by the base station 702).

In a seventh communication 718, the AN 704 may transmit a request for resources from the base station 702 to perform an RFID read and/or transmit backscatter information to the base station 702. The request may also include a request for authorization to perform the RFID read. In response, the base station 702 may transmit a command to the AN 704 to perform the RFID read, as well as a resource allocation and/or scheduling for the read, in an eighth communication 720.

In a ninth communication 722, the AN 704 may transmit an energy signal to one or more devices with RFID tags 706 using allocated resources provided by the base station 702. In a tenth communication 724, the AN 704 may receive the backscatter information from the RFID tag(s) 706. In an eleventh communication 726, the AN 704 may transmit an indication of the backscatter information (e.g., a forwarded message comprising the received backscatter information, or a message comprising decoded backscatter information) to the base station 702.

FIG. 10 is a flowchart 1000 of a method of wireless communication by an AN (e.g., AN 704 of FIG. 7). As used herein, the term "network node" may relate to a base station or a component of a base station (e.g., a disaggregated base station component) At 1002, the AN may transmit, in a registration transmission to the network node, an AN capability message comprising an indication of a capability to: (i) transmit an energy signal to the passive node, (ii) receive the backscatter signal from the passive node, and (iii) and transmit the indication of the backscatter signal to the network node. For example, 802 may be performed by a transmitting component 1140 of FIG. 11. For example, as illustrated in FIG. 7, the AN 704 may transmit a registration message to the base station at the first communication 708. In some examples, the registration message may include the AN capability message, or the AN capability message may be transmitted to the base station 702 at another time (e.g., after the base station 702 indicates its support and/or capability for PIoT/RFID reading in a message to the AN 704).

At 1004, the AN may receive, from the network node, a network node support message indicating that the network node supports transmission of the energy signal by the AN. For example, 1004 may be performed by a receiving component 1142 of FIG. 11. Here, the network node may transmit a message to the AN indicating that the network node supports PIoT/RFID reading and associated transmissions. However, the network node may also indicate that the PIoT/RFID reading and associated transmissions are not supported in the cell due to congested traffic or any other suitable reason. For example, the network node support message may be part of the second communication 710 of FIG. 7.

At 1006, the AN may transmit, in response to the received network node support message, an AN capability message comprising an indication of a capability to: (i) transmit an energy signal to the passive node, (ii) receive the backscatter signal from the passive node, and (iii) and transmit the indication of the backscatter signal to the network node. For example, 1006 may be performed by the transmitting component 1140 of FIG. 11. Here, if the network node indicates that it supports transmission of an energy signal for PIoT/RFID reading, then the AN may transmit its capabilities to the network node via an AN capability message or registration message. For example, the capabilities described above in reference to FIGS. 7-9.

At 1008, the AN may transmit, to the network node, an AN capability message comprising an indication of which class, of a plurality of classes, is associated with the AN, wherein each of the plurality of classes is indicative of one or more types of signaling supported by the AN. For example, 1008 may be performed by the transmitting component 1140 of FIG. 11. Here, the AN may be associated with a particular class of ANs, wherein the class is indicative of one or more capabilities of the AN. As such, the AN may simply transmit an indication of its class to the network node in order to provide the network node with an indication of its capabilities via an AN capability message or registration message.

At 1010, the AN may transmit, to the network node, an AN capability message comprising an indication of whether the AN can transmit signaling using time-division multiplexing (TDM), frequency-division multiplexing (FDM), or spatial-domain multiplexing (SDM). For example, 1010 may be performed by the transmitting component 1140 of FIG. 11. The AN may be capable of performing one or more types of multiplexing, and may provide an indication of such a capability to the network node via an AN capability message or registration message.

At 1012, the AN may transmit, to the network node, an AN capability message comprising an indication of whether the AN can transmit one or more of the cellular signal, the power transfer signal, or the energy transfer signal in full-duplex. For example, 1012 may be performed by the transmitting component 1140 of FIG. 11. In some examples, the AN may be capable of full-duplex communication (e.g., transmit and receive a single type of signal at the same time, or transmit a first type of signal receive a second type of signal at the same time) and thus may provide the network node with an indication of its full-duplex capability via an AN capability message or registration message.

At 1014, the AN may transmit, to the network node, an AN capability message comprising an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) and number of antennas associated with each type of antenna. For example, 1014 may be performed by the transmitting component 1140 of FIG. 11. Here, the AN may indicate to the network node different parameters of its RFID reading and transmission operations via an AN capability message or registration message.

At 1016, the AN may receive, from a network node, an energy transfer configuration providing the AN with a resource allocation for transmission of an information signal to the network node, the information signal comprising an indication of a backscatter signal received from a passive node. For example, 1016 may be performed by the receiving component 1142 of FIG. 11. Here, if the network node supports an energy transfer (e.g., for RFID/SWIPT transmission/reception and/or other PIoT operations) by the AN, then the network node may provide the AN with scheduling information and/or time and frequency resources for energy transfer.

At 1018, the AN may transmit, to the passive node, an energy signal. For example, 1018 may be performed by the transmitting component 1140 of FIG. 11. Here, the AN may transmit an energy signal to an RFID tag, as illustrated in FIG. 6.

At 1020, the AN may receive, from the passive node, the backscatter signal, wherein the backscatter signal is a modulated version of the transmitted energy signal. For example, 1020 may be performed by the receiving component 1142 of FIG. 11. Here, the AN may receive the backscatter signal from the RFID tag, as illustrated in FIG. 6.

At 1022, the AN may transmit, based on the resource allocation, the information signal to the network node. For example, 1022 may be performed by the transmitting component 1140 of FIG. 11. Here, the AN may receive the backscatter information from the RFID tag, and forward it to the network node. In another example, the AN may first decode the backscatter information and transmitted the decoded information to the network node.

In certain aspects, the energy transfer configuration provides the AN with an indication of at least one of a frequency for transmitting the information signal, or a power level for transmitting the information signal.

In certain aspects, the indication of the network node capability is at least one of a broadcast message or a dedicated message to the AN.

In certain aspects, the AN includes an antenna array defined by one or more types of antenna, wherein the one or more types of antenna comprise a cellular antenna, a power transfer antenna, or an energy transfer antenna.

In certain aspects, the antenna array comprises a first type of antenna, and wherein the first type of antenna is configured to communicate at least two of a cellular signal, a power transfer signal, or an energy transfer signal.

In certain aspects, the one or more types of signaling comprises: pass-through signaling, amplify-and-forward signaling, beam steering signaling, and decode-and-forward signaling.

In certain aspects, the one or more processors are further configured communicate a cellular signal, a power transfer signal, and an energy transfer signal, and wherein the information signal is an energy transfer signal.

In certain aspects, the AN may be configured to transmit and/or receive a cellular signal, a power transfer signal, and/or an energy transfer signal. For example, the AN may communicate each of the cellular signal, the power transfer signal, and the energy transfer signal via contiguous intra-band carrier aggregation, non-contiguous intra-band carrier aggregation, or non-contiguous inter-band carrier aggregation.

In certain aspects, the network node comprises a user equipment (UE), a base station, or a component of a base station.

Figure 11:
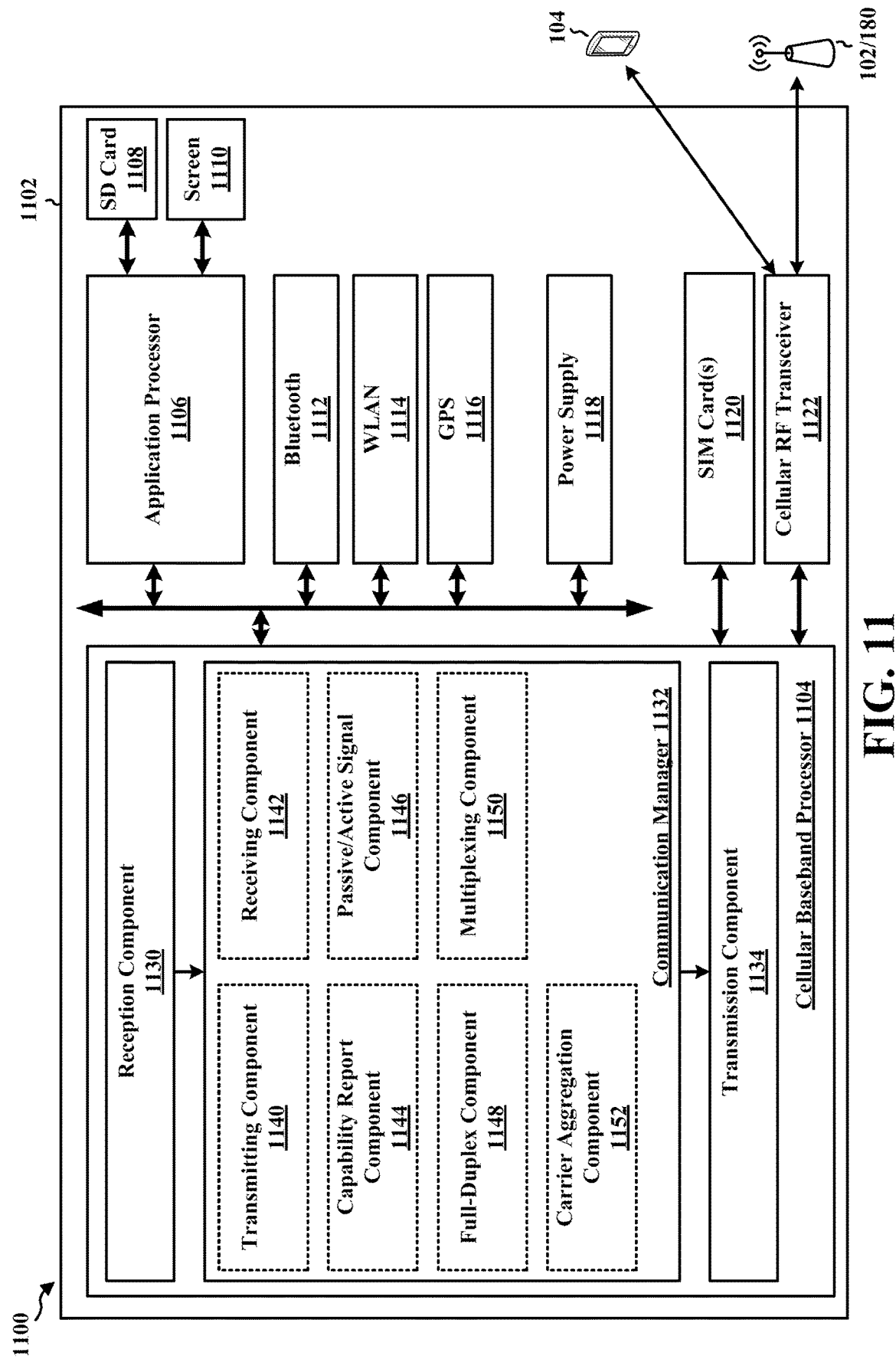
FIG. 11 is a diagram illustrating an example of a hardware implementation for an example apparatus.

FIG. 11 is a diagram 1100 illustrating an example of a hardware implementation for an apparatus 1102. The apparatus 1102 is an AN (e.g., AN 102/180/102r of FIG. 1) and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or B S 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a transmitting component 1140 that is configured to transmit, in a registration transmission to the network node, an AN capability message comprising an indication of a capability to: (i) transmit an energy signal to the passive node, (ii) receive the backscatter signal from the passive node, and (iii) and transmit the indication of the backscatter signal to the network node, e.g., as described in connection with 1002 of FIG. 10; transmit, in response to the received network node support message, an AN capability message comprising an indication of a capability to: (i) transmit an energy signal to the passive node, (ii) receive the backscatter signal from the passive node, and (iii) and transmit the indication of the backscatter signal to the network node, e.g., as described in connection with 1006 of FIG. 10; transmit, to the network node, an AN capability message comprising an indication of which class, of a plurality of classes, is associated with the AN, wherein each of the plurality of classes is indicative of one or more types of signaling supported by the AN, e.g., as described in connection with 1008 of FIG. 10; transmit, to the network node, an AN capability message comprising an indication of whether the AN can transmit signaling using time-division multiplexing (TDM), frequency-division multiplexing (FDM), or spatial-domain multiplexing (SDM), e.g., as described in connection with 1010 of FIG. 10; transmit, to the network node, an AN capability message comprising an indication of whether the AN can transmit one or more of the cellular signal, the power transfer signal, or the energy transfer signal in full-duplex, e.g., as described in connection with 1012 of FIG. 10; transmit, to the network node, an AN capability message comprising an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) and number of antennas associated with each type of antenna, e.g., as described in connection with 1014 of FIG. 10; transmit, to the passive node, an energy signal, e.g., as described in connection with 1018 of FIG. 10; and transmit, based on the resource allocation, the information signal to the network node, e.g., as described in connection with 1022 of FIG. 10.

The communication manager 1132 includes a receiving component 1142 that is configured to receive, from the network node, a network node support message indicating that the network node supports transmission of the energy signal by the AN, e.g., as described in connection with 1004 of FIG. 10; receive, from a network node, an energy transfer configuration providing the AN with a resource allocation for transmission of an information signal to the network node, the information signal comprising an indication of a backscatter signal received from a passive node, e.g., as described in connection with 1016 of FIG. 10; receive, from the passive node, the backscatter signal, wherein the backscatter signal is a modulated version of the transmitted energy signal, e.g., as described in connection with 1020 of FIG. 10.

The apparatus may include additional components that perform the functions described herein and in each of the blocks of the algorithm in the aforementioned flowchart of FIG. 10. As such, each function and block in the aforementioned flowchart may be performed by a component and the apparatus may include one or more of those components. For example, the apparatus may include a capability report component 1144 for generating an indication or report of AN capabilities to the network node. The apparatus may also include a passive/active signal component 1146 providing the AN with an ability to perform passive signal forwarding or active signal generation in communications between the AN and an RFID and the network node. The apparatus may also include a full-duplex component 1148 that provides the apparatus with one or more full-duplex capabilities. The apparatus may also include a multiplexing component 1150 that provides the apparatus with the ability for perform communications and energy transfer using one or more multiplexing capabilities. The apparatus may also include a carrier aggregation component 1152 configured to provide the apparatus with one or more carrier aggregation capabilities.

The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for transmitting, in a registration transmission to the network node, an AN capability message comprising an indication of a capability to: (i) transmit an energy signal to the passive node, (ii) receive the backscatter signal from the passive node, and (iii) and transmit the indication of the backscatter signal to the network node.

In one configuration, the apparatus 1102, and in particular the cellular baseband processor 1104, includes means for transmitting, in response to the received network node support message, an AN capability message comprising an indication of a capability to: (i) transmit an energy signal to the passive node, (ii) receive the backscatter signal from the passive node, and (iii) and transmit the indication of the backscatter signal to the network node.

In one configuration, the apparatus 1102, and in particular the cellular baseband processor 1104, includes means for transmitting, to the network node, an AN capability message comprising an indication of which class, of a plurality of classes, is associated with the AN, wherein each of the plurality of classes is indicative of one or more types of signaling supported by the AN.

In one configuration, the apparatus 1102, and in particular the cellular baseband processor 1104, includes means for transmitting, to the network node, an AN capability message comprising an indication of whether the AN can transmit signaling using time-division multiplexing (TDM), frequency-division multiplexing (FDM), or spatial-domain multiplexing (SDM).

In one configuration, the apparatus 1102, and in particular the cellular baseband processor 1104, includes means for transmitting, to the network node, an AN capability message comprising an indication of whether the AN can transmit one or more of the cellular signal, the power transfer signal, or the energy transfer signal in full-duplex.

In one configuration, the apparatus 1102, and in particular the cellular baseband processor 1104, includes means for transmitting, to the network node, an AN capability message comprising an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) and number of antennas associated with each type of antenna.

In one configuration, the apparatus 1102, and in particular the cellular baseband processor 1104, includes means for transmitting, to the passive node, an energy signal.

In one configuration, the apparatus 1102, and in particular the cellular baseband processor 1104, includes means for transmitting, based on the resource allocation, the information signal to the network node.

In one configuration, the apparatus 1102, and in particular the cellular baseband processor 1104, includes means for receiving, from the network node, a network node support message indicating that the network node supports transmission of the energy signal by the AN.

In one configuration, the apparatus 1102, and in particular the cellular baseband processor 1104, includes means for receiving, from a network node, an energy transfer configuration providing the AN with a resource allocation for transmission of an information signal to the network node, the information signal comprising an indication of a backscatter signal received from a passive node.

In one configuration, the apparatus 1102, and in particular the cellular baseband processor 1104, includes means for receiving, from the passive node, the backscatter signal, wherein the backscatter signal is a modulated version of the transmitted energy signal.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a flowchart 1200 of a method of wireless communication. The method may be performed by a network node. The network node may be comprised of a UE (e.g., the UE 104 of FIG. 1), a base station (e.g., base station 102 of FIG. 1), or a component of a base station (e.g., RU/DU/CU of FIG. 5).

At 1202, the network node may transmit, via a broadcast message or a dedicated message, a network node support message indicating that the network node supports transmission of the energy signal by the AN. For example, 1202 may be performed by a transmitting component 1340. Here, the network node may indicate whether it supports energy transfer (e.g., RFID reading and/or PIoT signaling). Traffic congestion in the cell may prevent the network node from allows the AN to perform such signaling.

At 1204, the network node may receive an AN capability message comprising an indication of a capability of the AN to: (i) transmit an energy signal to the passive node, (ii) receive the backscatter signal from the passive node, and (iii) and transmit the indication of the backscatter signal to the network node. For example, 1204 may be performed by a receiving component 1342. Here, the network node may receive in indication of the AN capability to perform RFID reading and PIoT signaling.

At 1206, the network node may receive, in a registration transmission, an AN capability message comprising an indication of a capability of the AN to: (i) transmit an energy signal to the passive node, (ii) receive the backscatter signal from the passive node, and (iii) and transmit the indication of the backscatter signal to the network node. For example, 1206 may be performed by a receiving component 1342. Here, the network node may receive a registration message comprising an indication of AN capabilities.

At 1208, the network node may receive an AN capability message comprising an indication of whether the AN can transmit one or more of the cellular signal, the power transfer signal, or the energy transfer signal in full-duplex. For example, 1208 may be performed by a receiving component 1342. Here, the network node may receive a registration message comprising an indication of full-duplex AN capabilities.

At 1210, the network node may receive an AN capability message comprising an indication of at least one of: (i) one or more types of antenna at the AN, (ii) a number of beams associated with each type of antenna, (iii) a maximum transmit power associated with each type of antenna, (iv) a maximum amplification gain associated with each type of antenna, and (v) and number of antennas associated with each type of antenna. For example, 1210 may be performed by a receiving component 1342. Here, the network node may receive parameters of AN communications.

At 1212, the network node may receive an AN capability message comprising an indication of which class, of a plurality of classes, is associated with the AN, wherein each of the plurality of classes is indicative of one or more types of signaling supported by the AN. For example, 1212 may be performed by a receiving component 1342. Here, the network node may receive an indication of a class associated with the AN.

At 1214, the network node may receive an AN capability message comprising an indication of whether the AN can transmit signaling using time-division multiplexing (TDM), frequency-division multiplexing (FDM), or spatial-domain multiplexing (SDM). For example, 1214 may be performed by a receiving component 1342. Here, the network node may receive an indication of whether the AN can support signal multiplexing, and what types of signal multiplexing are supported at the AN.

At 1216, the network node may transmit an energy transfer configuration providing an assisting node (AN) with a resource allocation for transmission of an information signal to the network node, the information signal comprising an indication of a backscatter signal received from a passive node. For example, 1216 may be performed by a transmitting component 1340. Here, the network node may provide the AN with resources (e.g., time and frequency) for performing RFID reading and PIoT communications.

At 1218, the network node may receive, based on the resource allocation, the information signal from the AN. For example, 1218 may be performed by a receiving component 1342.

In certain aspects, the energy transfer configuration comprises an indication of at least one of a frequency for transmitting the information signal, or a power level for transmitting the information signal.

FIG. 13 is a diagram 1300 illustrating an example of a hardware implementation for an apparatus 1302. The apparatus 1302 may be a base station, a base station component, or a UE operating in sideband. The apparatus 1302 and includes a baseband unit 1304. The baseband unit 1304 may communicate through a cellular RF transceiver with an AN 102/180/102r. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a transmitting component 1340 configured to transmit, via a broadcast message or a dedicated message, a network node support message indicating that the network node supports transmission of the energy signal by the AN, e.g., as described in connection with 1202 of FIG. 12; and transmit an energy transfer configuration providing an assisting node (AN) with a resource allocation for transmission of an information signal to the network node, the information signal comprising an indication of a backscatter signal received from a passive node, e.g., as described in connection with 1216 of FIG. 12.

The communication manager 1332 further includes a receiving component 1342 configured to receive an AN capability message comprising an indication of a capability of the AN to: (i) transmit an energy signal to the passive node, (ii) receive the backscatter signal from the passive node, and (iii) and transmit the indication of the backscatter signal to the network node, e.g., as described in connection with 1204 of FIG. 12; receive, in a registration transmission, an AN capability message comprising an indication of a capability of the AN to: (i) transmit an energy signal to the passive node, (ii) receive the backscatter signal from the passive node, and (iii) and transmit the indication of the backscatter signal to the network node, e.g., as described in connection with 1206 of FIG. 12; receive an AN capability message comprising an indication of whether the AN can transmit one or more of the cellular signal, the power transfer signal, or the energy transfer signal in full-duplex, e.g., as described in connection with 1208 of FIG. 12; receive an AN capability message comprising an indication of at least one of: (i) one or more types of antenna at the AN, (ii) a number of beams associated with each type of antenna, (iii) a maximum transmit power associated with each type of antenna, (iv) a maximum amplification gain associated with each type of antenna, and (v) and number of antennas associated with each type of antenna, e.g., as described in connection with 1210 of FIG. 12; receive an AN capability message comprising an indication of which class, of a plurality of classes, is associated with the AN, wherein each of the plurality of classes is indicative of one or more types of signaling supported by the AN, e.g., as described in connection with 1212 of FIG. 12; receive an AN capability message comprising an indication of whether the AN can transmit signaling using time-division multiplexing (TDM), frequency-division multiplexing (FDM), or spatial-domain multiplexing (SDM), e.g., as described in connection with 1214 of FIG. 12; receive, based on the resource allocation, the information signal from the AN e.g., as described in connection with 1218 of FIG. 12.

The apparatus may include additional components that perform each of the blocks of the algorithm in the aforementioned flowchart of FIG. 12. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmit, via a broadcast message or a dedicated message, a network node support message indicating that the network node supports transmission of the energy signal by the AN.

In one configuration, the apparatus 1302, and in particular the baseband unit 1304, includes means for receiving an AN capability message comprising an indication of a capability of the AN to: (i) transmit an energy signal to the passive node, (ii) receive the backscatter signal from the passive node, and (iii) and transmit the indication of the backscatter signal to the network node.

In one configuration, the apparatus 1302, and in particular the baseband unit 1304, includes means for receiving, in a registration transmission, an AN capability message comprising an indication of a capability of the AN to: (i) transmit an energy signal to the passive node, (ii) receive the backscatter signal from the passive node, and (iii) and transmit the indication of the backscatter signal to the network node.

In one configuration, the apparatus 1302, and in particular the baseband unit 1304, includes means for receiving an AN capability message comprising an indication of whether the AN can transmit one or more of the cellular signal, the power transfer signal, or the energy transfer signal in full-duplex.

In one configuration, the apparatus 1302, and in particular the baseband unit 1304, includes means for receiving an AN capability message comprising an indication of whether the AN can transmit one or more of the cellular signal, the power transfer signal, or the energy transfer signal in full-duplex.

In one configuration, the apparatus 1302, and in particular the baseband unit 1304, includes means for receiving an AN capability message comprising an indication of which class, of a plurality of classes, is associated with the AN, wherein each of the plurality of classes is indicative of one or more types of signaling supported by the AN.

In one configuration, the apparatus 1302, and in particular the baseband unit 1304, includes means for receiving an AN capability message comprising an indication of whether the AN can transmit signaling using time-division multiplexing (TDM), frequency-division multiplexing (FDM), or spatial-domain multiplexing (SDM).

In one configuration, the apparatus 1302, and in particular the baseband unit 1304, includes means for transmitting an energy transfer configuration providing an assisting node (AN) with a resource allocation for transmission of an information signal to the network node, the information signal comprising an indication of a backscatter signal received from a passive node.

In one configuration, the apparatus 1302, and in particular the baseband unit 1304, includes means for receiving, based on the resource allocation, the information signal from the AN.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

ADDITIONAL CONSIDERATIONS

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method of wireless communication at an assisting node (AN), comprising: receiving, from a network node, an energy transfer configuration providing the AN with a resource allocation for transmission of an information signal to the network node, the information signal comprising an indication of a backscatter signal received from a passive node; and transmitting, based on the resource allocation, the information signal to the network node.

Example 2 is the method of example 1, wherein the method further comprises: transmitting, to the passive node, an energy signal; and receiving, from the passive node, the backscatter signal, wherein the backscatter signal is a modulated version of the transmitted energy signal.

Example 3 is the method of example 2, wherein the energy transfer configuration provides the AN with an indication of at least one of a frequency for transmitting the information signal, or a power level for transmitting the information signal.

Example 4 is the method of any of example 2 and 3, wherein the method further comprises: receiving, from the network node, a network node support message indicating that the network node supports transmission of the energy signal by the AN; and transmitting, in response to the received network node support message, an AN capability message comprising an indication of a capability to: (i) transmit an energy signal to the passive node, (ii) receive the backscatter signal from the passive node, and (iii) and transmit the indication of the backscatter signal to the network node.

Example 5 is the method of example 4, wherein the network node support message is received via at least one of a broadcast message or a dedicated message to the AN.

Example 6 is the method of any of examples 1-5, wherein the method further comprises: transmitting, in a registration transmission to the network node, an AN capability message comprising an indication of a capability to: (i) transmit an energy signal to the passive node, (ii) receive the backscatter signal from the passive node, and (iii) and transmit the indication of the backscatter signal to the network node.

Example 7 is the method of any of examples 1-6, further comprising an antenna array defined by one or more types of antenna, wherein the one or more types of antenna comprise a cellular antenna, a power transfer antenna, or an energy transfer antenna.

Example 8 is the method of example 7, wherein the antenna array comprises a first type of antenna, and wherein the first type of antenna is configured to communicate at least two of a cellular signal, a power transfer signal, or an energy transfer signal.

Example 9 is the method of example 8, wherein the method further comprises: transmitting, to the network node, an AN capability message comprising an indication of whether the AN can transmit one or more of the cellular signal, the power transfer signal, or the energy transfer signal in full-duplex.

Example 10 is the method of any of examples 7-9, wherein the method further comprises: transmitting, to the network node, an AN capability message comprising an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) and number of antennas associated with each type of antenna.

Example 11 is the method of any of examples 1-10, wherein the method further comprises: transmitting, to the network node, an AN capability message comprising an indication of which class, of a plurality of classes, is associated with the AN, wherein each of the plurality of classes is indicative of one or more types of signaling supported by the AN.

Example 12 is the method of example 11, wherein the one or more types of signaling comprises: pass-through signaling, amplify-and-forward signaling, beam steering signaling, and decode-and-forward signaling.

Example 13 is the method of any of examples 1-12, wherein the method further comprises: transmitting, to the network node, an AN capability message comprising an indication of whether the AN can transmit one or more types of signaling using time-division multiplexing (TDM), frequency-division multiplexing (FDM), or spatial-domain multiplexing (SDM).

Example 14 is the method of any of examples 1-13, wherein the method further comprises communicating a cellular signal, a power transfer signal, and an energy transfer signal, and wherein the information signal is an energy transfer signal.

Example 15 is the method of example 14, wherein communicating the cellular signal, the power transfer signal, and the energy transfer signal, further comprises communicating each of the cellular signal, the power transfer signal, and the energy transfer signal via contiguous intra-band carrier aggregation, non-contiguous intra-band carrier aggregation, or non-contiguous inter-band carrier aggregation.

Example 16 is the method of any of examples 1-15, wherein the network node comprises a user equipment (UE) or a base station.

Example 17 is a method of wireless communication by a network node, comprising: transmitting an energy transfer configuration providing an assisting node (AN) with a resource allocation for transmission of an information signal to the network node, the information signal comprising an indication of a backscatter signal received from a passive node; and receiving, based on the resource allocation, the information signal from the AN.

Example 18 is the method of example 17, wherein the energy transfer configuration comprises an indication of at least one of a frequency for transmitting the information signal, or a power level for transmitting the information signal.

Example 19 is the method of any of examples 17 and 18, wherein the method further comprises: transmitting, via a broadcast message or a dedicated message, a network node support message indicating that the network node supports transmission of an energy signal by the AN; and receiving an AN capability message comprising an indication of a capability of the AN to: (i) transmit an energy signal to the passive node, (ii) receive the backscatter signal from the passive node, and (iii) and transmit the indication of the backscatter signal to the network node.

Example 20 is the method of any of examples 17-19, wherein the method further comprises: receiving, in a registration transmission, an AN capability message comprising an indication of a capability of the AN to: (i) transmit an energy signal to the passive node, (ii) receive the backscatter signal from the passive node, and (iii) and transmit the indication of the backscatter signal to the network node.

Example 21 is the method of any of examples 17-20, wherein the method further comprises: receiving an AN capability message comprising an indication of whether the AN can transmit one or more of a cellular signal, a power transfer signal, or an energy transfer signal in full-duplex.

Example 22 is the method of any of examples 17-21, wherein the method further comprises: receiving an AN capability message comprising an indication of at least one of: (i) one or more types of antenna at the AN, (ii) a number of beams associated with each type of antenna, (iii) a maximum transmit power associated with each type of antenna, (iv) a maximum amplification gain associated with each type of antenna, and (v) and number of antennas associated with each type of antenna.

Example 23 is the method of any of examples 17-22, wherein the method further comprises: receiving an AN capability message comprising an indication of which class, of a plurality of classes, is associated with the AN, wherein each of the plurality of classes is indicative of one or more types of signaling supported by the AN.

Example 24 is the method of any of examples 17-23, wherein the method further comprises: receiving an AN capability message comprising an indication of whether the AN can transmit one or more types of signaling using time-division multiplexing (TDM), frequency-division multiplexing (FDM), or spatial-domain multiplexing (SDM).

Example 25 is an assisting node (AN) comprising: a memory; and a processor coupled to the memory, the processor and memory being configured to perform the method of any of examples 1-16.

Example 26 is a network node comprising: a memory; and a processor coupled to the memory, the processor and memory being configured to perform the method of any of examples 17-24.

Example 27 is an assisting node (AN) comprising one or more means for performing the method of any of examples 1-16.

Example 28 is a network node comprising one or more means for performing the method of any of examples 17-24.

Example 29 is a non-transitory computer-readable storage medium having instructions stored thereon for performing the method of any of examples 1-16 for wireless communication by an assisting node (AN).

Example 30 is a non-transitory computer-readable storage medium having instructions stored thereon for performing the method of any of examples 17-24 for wireless communication by a network node.

What is claimed is:

1. An assisting node (AN) for wireless communications, comprising:
   an antenna array configured to communicate at least two of a cellular signal, a power transfer signal, or an energy transfer signal;
   a memory comprising instructions; and
   one or more processors configured to execute the instructions and cause the AN to:
     receive from a network node, an energy transfer configuration providing the AN with a resource allocation for transmission, via the antenna array, of an information signal to the network node, the information signal comprising an indication of a backscatter signal received from a passive node; and
     transmit, via the antenna array according to the allocated resource, the information signal to the network node, wherein the network node comprises a user equipment (UE) or a base station.

2. The AN of claim 1, wherein the one or more processors are further configured to cause the AN to:
   transmit, to the passive node, an energy signal; and
   receive, from the passive node, the backscatter signal, wherein the backscatter signal is a modulated version of the transmitted energy signal.

3. The AN of claim 2, wherein the energy transfer configuration provides the AN with an indication of at least one of a frequency for transmitting the information signal, or a power level for transmitting the information signal.

4. The AN of claim 2, wherein the one or more processors are further configured to cause the AN to:
   receive, from the network node, a network node support message indicating that the network node supports transmission of the energy signal by the AN; and
   transmit, in response to the received network node support message, an AN capability message comprising an indication of a capability to: (i) transmit an energy signal to the passive node, (ii) receive the backscatter signal from the passive node, and (iii) transmit the indication of the backscatter signal to the network node.

5. The AN of claim 4, wherein the network node support message is received via at least one of a broadcast message or a dedicated message to the AN.

6. The AN of claim 1, wherein the one or more processors are further configured to cause the AN to:
   transmit, in a registration transmission to the network node, an AN capability message comprising an indication of a capability to: (i) transmit an energy signal to the passive node, (ii) receive the backscatter signal from the passive node, and (iii) transmit the indication of the backscatter signal to the network node.

7. The AN of claim 1, wherein the antenna array is defined by one or more types of antenna, and wherein the one or more types of antenna comprise a cellular antenna, a power transfer antenna, or an energy transfer antenna.

8. The AN of claim 7, wherein the antenna array comprises a first type of antenna, and wherein the first type of antenna is configured to communicate the at least two of the cellular signal, the power transfer signal, or the energy transfer signal.

9. The AN of claim 8, wherein the one or more processors are further configured to cause the AN to:
   transmit, to the network node, an AN capability message comprising an indication of whether the AN can transmit one or more of the cellular signal, the power transfer signal, or the energy transfer signal in full-duplex.

10. The AN of claim 7, wherein the one or more processors are further configured to cause the AN to:
    transmit, to the network node, an AN capability message comprising an indication of at least one of: (i) the one or more types of antenna, (ii) a number of beams associated with each type of antenna, (iii) a maximum transmit power associated with each type of antenna, (iv) a maximum amplification gain associated with each type of antenna, and (v) number of antennas associated with each type of antenna.

11. The AN of claim 1, wherein the one or more processors are further configured to cause the AN to:
    transmit, to the network node, an AN capability message comprising an indication of which class, of a plurality of classes, is associated with the AN, wherein each of the plurality of classes is indicative of one or more types of signaling supported by the AN.

12. The AN of claim 11, wherein the one or more types of signaling comprises: pass-through signaling, amplify-and-forward signaling, beam steering signaling, and decode-and-forward signaling.

13. The AN of claim 1, wherein the one or more processors are further configured to cause the AN to:
    transmit, to the network node, an AN capability message comprising an indication of whether the AN can transmit one or more types of signaling using time-division multiplexing (TDM), frequency-division multiplexing (FDM), or spatial-domain multiplexing (SDM).

14. The AN of claim 1, wherein the one or more processors are further configured communicate a cellular signal, a power transfer signal, and an energy transfer signal, and wherein the information signal is an energy transfer signal.

15. The AN of claim 14, wherein the one or more processors, being configured to communicate the cellular signal, the power transfer signal, and the energy transfer signal, are further configured to communicate each of the cellular signal, the power transfer signal, and the energy transfer signal via contiguous intra-band carrier aggregation, non-contiguous intra-band carrier aggregation, or non-contiguous inter-band carrier aggregation.

16. A network node for wireless communications, comprising:
    a memory comprising instructions; and
    one or more processors configured to execute the instructions and cause the network node to:

receive, from an assisting node (AN), a capability message comprising an indication of at least one of: (i) one or more types of antenna at the AN, (ii) a number of beams associated with each type of antenna, (iii) a maximum transmit power associated with each type of antenna, (iv) a maximum amplification gain associated with each type of antenna, and (v) number of antennas associated with each type of antenna;

transmit, after receiving the capability message, an energy transfer configuration providing the AN with a resource allocation for transmission of an information signal to the network node, the information signal comprising an indication of a backscatter signal received from a passive node; and receive, via the allocated resource, the information signal from the AN, wherein the network node is implemented as a user equipment (UE) or a base station.

17. The network node of claim 16, wherein the energy transfer configuration comprises an indication of at least one of a frequency for transmitting the information signal, or a power level for transmitting the information signal.

18. The network node of claim 16, wherein the one or more processors are further configured to cause the network node to:

transmit, via a broadcast message or a dedicated message, a network node support message indicating that the network node supports transmission of an energy signal by the AN; and receive an AN capability message comprising an indication of a capability of the AN to: (i) transmit an energy signal to the passive node, (ii) receive the backscatter signal from the passive node, and (iii) transmit the indication of the backscatter signal to the network node.

19. The network node of claim 16, wherein the one or more processors are further configured to cause the network node to:

receive, in a registration transmission, an AN capability message comprising an indication of a capability of the AN to: (i) transmit an energy signal to the passive node, (ii) receive the backscatter signal from the passive node, and (iii) transmit the indication of the backscatter signal to the network node.

20. The network node of claim 16, wherein the one or more processors are further configured to cause the network node to:

receive an AN capability message comprising an indication of whether the AN can transmit one or more of a cellular signal, a power transfer signal, or an energy transfer signal in full-duplex.

21. The network node of claim 16, wherein the one or more processors are further configured to cause the network node to:

receive an AN capability message comprising an indication of which class, of a plurality of classes, is associated with the AN, wherein each of the plurality of classes is indicative of one or more types of signaling supported by the AN.

22. The network node of claim 16, wherein the one or more processors are further configured to cause the network node to:

receive an AN capability message comprising an indication of whether the AN can transmit one or more types of signaling using time-division multiplexing (TDM), frequency-division multiplexing (FDM), or spatial-domain multiplexing (SDM).

23. A method for wireless communication by an assisting node (AN), comprising:

receiving, from a network node, an energy transfer configuration providing the AN with a resource allocation for transmission, via an antenna array, of an information signal to the network node, the information signal comprising an indication of a backscatter signal received from a passive node, and the antenna array configured to communicate at least two of a cellular signal, a power transfer signal, or an energy transfer signal; and transmitting, via the antenna array according to the allocated resource, the information signal to the network node, wherein the network node comprises a user equipment (UE) or a base station.

24. The method of claim 23, further comprising:
transmitting, to the passive node, an energy signal; and
receiving, from the passive node, the backscatter signal, wherein the backscatter signal is a modulated version of the transmitted energy signal.

25. The method of claim 24, wherein the energy transfer configuration provides the AN with an indication of at least one of a frequency for transmitting the information signal, or a power level for transmitting the information signal.

26. A method for wireless communication by a network node, comprising:

receiving, from an assisting node (AN), a capability message comprising an indication of at least one of: (i) one or more types of antenna at the AN, (ii) a number of beams associated with each type of antenna, (iii) a maximum transmit power associated with each type of antenna, (iv) a maximum amplification gain associated with each type of antenna, and (v) number of antennas associated with each type of antenna;

transmitting, after receiving the capability message, an energy transfer configuration providing the AN with a resource allocation for transmission of an information signal to the network node, the information signal comprising an indication of a backscatter signal received from a passive node; and receiving, via the allocated resource, the information signal from the AN, wherein the network node is implemented as a user equipment (UE) or a base station.

27. The method of claim 26, wherein the energy transfer configuration comprises an indication of at least one of a frequency for transmitting the information signal, or a power level for transmitting the information signal.

28. The method of claim 26, further comprising:
transmitting, via a broadcast message or a dedicated message, a network node support message indicating that the network node supports transmission of an energy signal by the AN; and
receiving an AN capability message comprising an indication of a capability of the AN to: (i) transmit the energy signal to the passive node, (ii) receive the backscatter signal from the passive node, and (iii) transmit the indication of the backscatter signal to the network node.

* * * * *